United States Patent
Narita

(10) Patent No.: US 10,839,529 B2
(45) Date of Patent: Nov. 17, 2020

(54) IMAGE PROCESSING APPARATUS AND IMAGE PROCESSING METHOD, AND STORAGE MEDIUM

(71) Applicant: CANON KABUSHIKI KAISHA, Tokyo (JP)

(72) Inventor: Yu Narita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 181 days.

(21) Appl. No.: 15/980,971

(22) Filed: May 16, 2018

(65) Prior Publication Data

US 2018/0336688 A1    Nov. 22, 2018

(30) Foreign Application Priority Data

May 17, 2017  (JP) .................................. 2017-098409

(51) Int. Cl.
G06T 7/246   (2017.01)
G06T 7/194   (2017.01)

(52) U.S. Cl.
CPC .............. *G06T 7/248* (2017.01); *G06T 7/194* (2017.01); *G06T 2207/20021* (2013.01)

(58) Field of Classification Search
CPC ....................... G06T 7/248; G06T 2207/20021
See application file for complete search history.

(56) References Cited

U.S. PATENT DOCUMENTS

2014/0185904 A1*  7/2014  Yonezawa .......... G06K 9/00604
                                                              382/133
2015/0085138 A1*  3/2015  Sugaya ............... H04N 5/23219
                                                              348/169

FOREIGN PATENT DOCUMENTS

JP   H06217188 A   8/1994
JP   2015089108 A   5/2015

* cited by examiner

*Primary Examiner* — Tuan H Nguyen
(74) *Attorney, Agent, or Firm* — Carter, DeLuca & Farrell LLP

(57) ABSTRACT

An image processing apparatus including an information acquisition unit that acquires information regarding a camera, an estimation unit that estimates an object of interest during shooting, in an image captured by the camera, based on the information regarding the camera, an area dividing unit that divides the image into a plurality of divided areas, using each of a plurality of types of dividing methods, and a motion vector detection unit that detects a motion vector in the plurality of divided areas regarding each of the plurality of types of dividing methods. The area dividing unit changes at least one of a size of a divided area and a number of division in each of the plurality of types of dividing methods for dividing the image, according to an object of interest estimated by the estimation unit.

15 Claims, 19 Drawing Sheets

FIG. 3

※NUMERICAL VALUES IN PARENTHESES INDICATE EXAMPLES OF BACKGROUND DEGREE/SUBJECT DEGREE

| CAMERA INFORMATION | OBJECT OF INTEREST | CLOSE TO BACKGROUND | CLOSE TO SUBJECT |
|---|---|---|---|
| SHOOTING MODE | | SCENERY (0.9/0.1) | PORTRAIT (0.1/0.9) |
| MAIN SUBJECT INFORMATION | DEGREE OF PERSON-LIKE APPEARANCE | LOW (0.7/0.3) | HIGH (0.3/0.7) |
| | SIZE | SMALL (0.8/0.2) | LARGE (0.2/0.8) |
| | MOVEMENT | LARGE (0.6/0.4) | SMALL (0.4/0.6) |
| SHUTTER SPEED | | SLOW (0.7/0.3) | FAST (0.3/0.7) |

AREA DIVISION OF IMAGE

☐ FEATURE EXTRACTION GRID
▨ PERIPHERY GRID

EXTRACTION OF FEATURE POINT FOR EACH IMAGE AREA

☐ FEATURE EXTRACTION GRID
▨ PERIPHERY GRID
• FEATURE POINT

F I G. 5
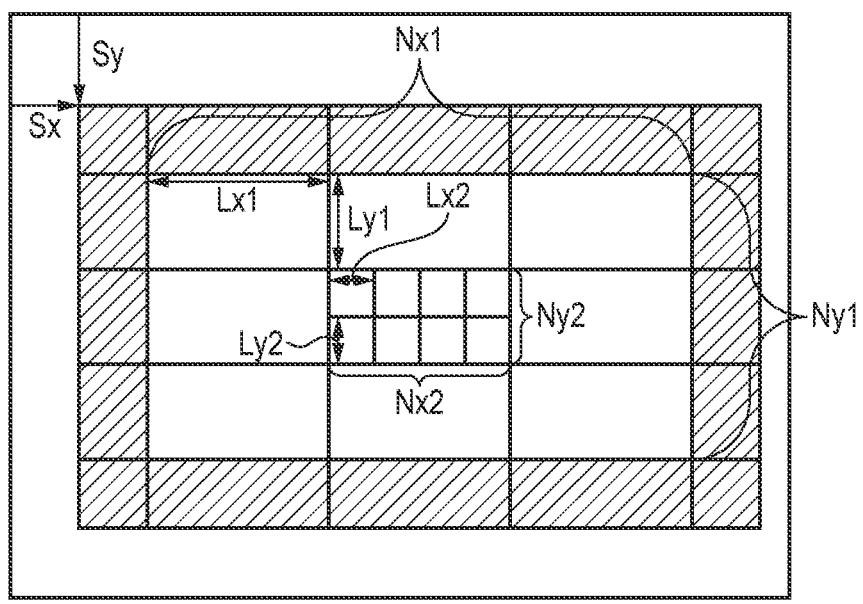
 FEATURE EXTRACTION GRID
 PERIPHERY GRID

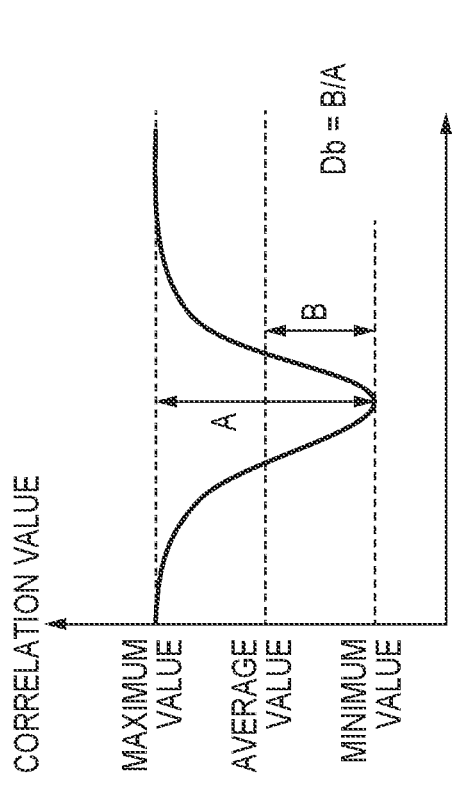
F I G. 14B
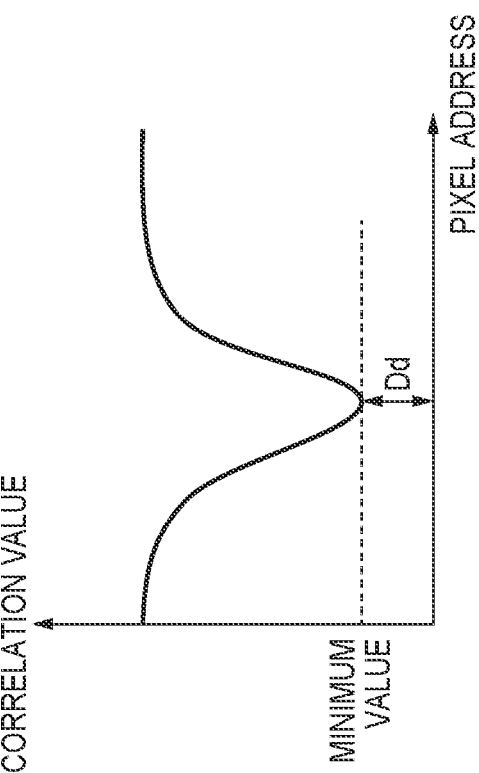
F I G. 14D
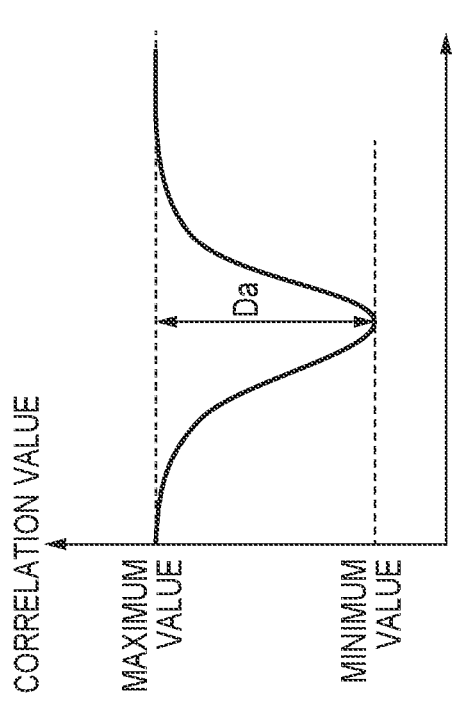
F I G. 14A
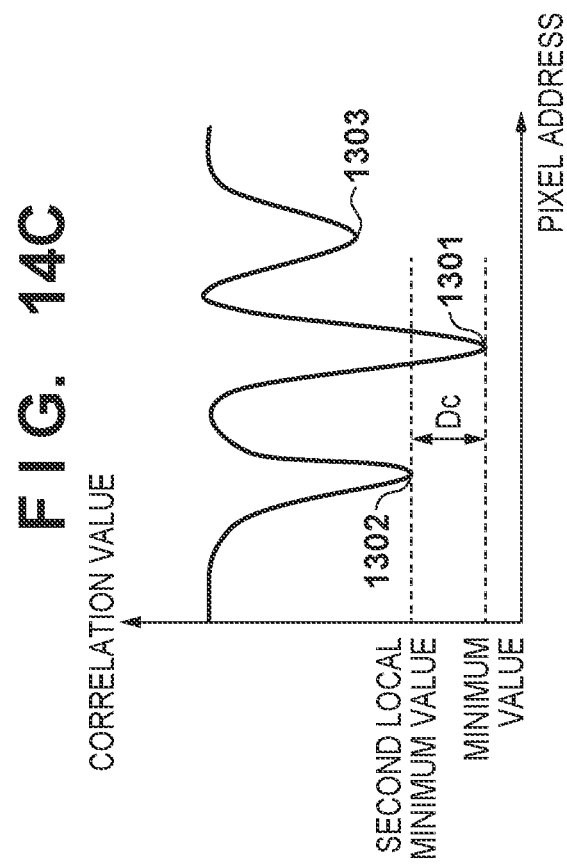
F I G. 14C

FIRST DIVIDED AREA

6x3=18

SECOND DIVIDED AREA

6x5=30

IMAGE PROCESSING APPARATUS AND IMAGE PROCESSING METHOD, AND STORAGE MEDIUM

BACKGROUND OF THE INVENTION

Field of the Invention

The present invention relates to a technique for detecting motion vectors between a plurality of frame images.

Description of the Related Art

It is necessary to detect moving amounts between frame images and align those images in order to perform image stabilization and dynamic range expansion processing on a video image that has been shot using an image capturing apparatus such as a digital camera.

Various methods for estimating moving amounts using frame images have been conventionally suggested, but as a representative method among such methods, there is a method for detecting motion vectors using template matching. In template matching, first, one of two frame images in a video image is set as a base image, and the other is set as a reference image. A rectangle that is arranged on the base image, and has a predetermined size is set as a template block, and a correlation between distribution of luminance values of the reference image and distribution of luminance values within the template block is obtained at each position in the reference image. As a result, a position in the reference image at which correlation is the highest is the position of destination of the template block, and the direction and the moving amount toward the position of the destination, when based on the position of the template block on the base image, form a motion vector.

At this time, the frame images include movement of a main subject and movement of a background that accompanies movement of the image capturing apparatus. If motion vector detection is performed on all of the pixels in the image, movement of the main subject and movement of the background can be comprehensively detected. However, it is difficult to detect motion vectors of all of the pixels on the camera system in real time, since it requires a significant circuit scale, processing time, memory band, and power consumption. In view of this, a technique for placing a focus on several pixels (hereinafter, referred to as points of interest) in an image, and detecting movement of a background and a main subject from moving amounts of these pixels is known (e.g., Japanese Patent Laid-Open No. 6-217188 and Japanese Patent Laid-Open No. 2015-89108).

Japanese Patent Laid-Open No. 6-217188 discloses a technique for detecting movement of a background from an image and detecting movement of a main subject based on the movement of the background. Japanese Patent Laid-Open No. 2015-89108 discloses a technique for switching the size of a motion vector detection area so as to mainly detect movement of a main subject in the case of performing subject tracking, and movement of a background in the case of not performing subject tracking.

The number of points of interest at which motion vectors can be detected on a camera system in real time is limited. It is required to detect movement of a background in a usage such as image stabilization, and thus it is desirable that points of interest are uniformly distributed in the screen. On the other hand, in a usage such as subject tracking, it is necessary to detect movement of a subject, and thus it is desirable that points of interest are densely distributed in a main subject. In addition, alignment of the entire screen and removal of a moving body area are performed in a usage such as HDR (high dynamic range) composition, and thus it is required to detect both movement of a background and movement of a main subject. In this manner, it is necessary to appropriately set a limited number of points of interest according to a usage.

However, in techniques disclosed in Japanese Patent Laid-Open No. 6-217188 and Japanese Patent Laid-Open No. 2015-89108, vector detection is always performed in a fixed area regardless of a shooting situation, and there was a problem in that a limited number of points of interests cannot be sufficiently utilized.

For example, in Japanese Patent Laid-Open No. 6-217188, certain number of movements are always detected for each of the background and the main subject. Therefore, even in the case where the degree of interest differs between the background and the main subject, the same number of detections will be assigned to one of the background and the main subject having a higher degree of interest and the other having a lower degree of interest. As described above, the number of points of interest is limited, and thus as a result of assigning, to the other having a lower degree of interest, the same number of detections as the one having a higher degree of interest, there are cases where movement of the one having a higher degree of interest cannot be sufficiently detected.

In Japanese Patent Laid-Open No. 2015-89108, whether to detect movement of the background and movement of the main subject is switched according to whether or not to perform subject tracking. Therefore, motion detection of both the background and the main subject cannot be performed (at the same time). In addition, it is envisioned that whether or not to perform subject tracking is determined according to an instruction of the photographer and whether or not the main subject can be detected. In moving image shooting, the scene dynamically changes, and thus it is troublesome and not practical for the photographer to give an instruction every time. In addition, it is difficult to understand intention of the photographer only from whether or not a main subject can be detected.

SUMMARY OF THE INVENTION

The present invention has been made in light of the above issues, and provides an image processing apparatus that can effectively detect movement of a background and a main subject from limited motion vector information.

According to a first aspect of the present invention, there is provided an image processing apparatus comprising: one or more processors; and a memory storing instructions which, when the instructions are executed by the one or more processors, cause the image processing apparatus to function as: an information acquisition unit configured to acquire information regarding a camera, an estimation unit configured to estimate an object of interest during shooting, in an image captured by the camera, based on the information regarding the camera, an area dividing unit configured to divide the image into a plurality of divided areas, using each of a plurality of types of dividing methods, and a motion vector detection unit configured to detect a motion vector in the plurality of divided areas regarding each of the plurality of types of dividing methods, wherein the area dividing unit changes at least one of a size of a divided area and a number of division in each of the plurality of types of dividing methods for dividing the image, according to an object of interest estimated by the estimation unit.

According to a second aspect of the present invention, there is provided an image processing method comprising: acquiring information regarding a camera; estimating an object of interest during shooting, in an image captured by the camera, based on the information regarding the camera; dividing the image into a plurality of divided areas, using each of a plurality of types of dividing methods; and detecting a motion vector in the plurality of divided areas regarding each of the plurality of types of dividing methods, wherein, in the dividing, at least one of a size of a divided area and a number of division in each of the plurality of types of dividing methods for dividing the image is changed according to an object of interest estimated in the estimating.

According to a third aspect of the present invention, there is provided a computer-readable storage medium that stores a program for causing a computer to execute steps of an image processing method, the method comprising: estimating an object of interest during shooting, in an image captured by a camera, based on information regarding the camera; dividing the image into a plurality of divided areas, using each of a plurality of types of dividing methods; and detecting a motion vector in the plurality of divided areas regarding each of the plurality of types of dividing methods, wherein in the dividing, at least one of a size of a divided area and a number of division in each of the plurality of types of dividing methods for dividing the image is changed according to an object of interest estimated in the estimating.

According to a fourth aspect of the present invention, there is provided an image processing apparatus comprising: one or more processors; and a memory storing instructions which, when the instructions are executed by the one or more processors, cause the image processing apparatus to function as: a setting unit configured to set a plurality of divided areas, in an image captured under an image capturing condition indicated by camera information that includes information regarding a shutter speed or a focal length, so as to not exceed a predetermined number of divided areas, based on the camera information, and a motion vector detection unit configured to detect a motion vector in the plurality of divided areas that have been set by the setting unit.

According to a fifth aspect of the present invention, there is provided a control method of an image processing apparatus, comprising: setting a plurality of divided areas, in an image captured under an image capturing condition indicated by camera information that includes information regarding a shutter speed or a focal length stored in a memory, so as to not exceed a predetermined number of divided areas, based on the camera information; and detecting a motion vector in the plurality of divided areas that have been set in the setting.

Further features of the present invention will become apparent from the following description of exemplary embodiments with reference to the attached drawings.

BRIEF DESCRIPTION OF THE DRAWINGS

FIG. 3 is a diagram showing the relationship between camera information and an object of interest.

FIG. 5 is a diagram for describing an example of area division of an image.

FIGS. 14A to 14D are diagrams for describing a correlation value index indicating the reliability of a motion vector.

DESCRIPTION OF THE EMBODIMENTS

Embodiment of the present invention will be described below in detail with reference to the attached drawings.

First Embodiment

Figure 1:
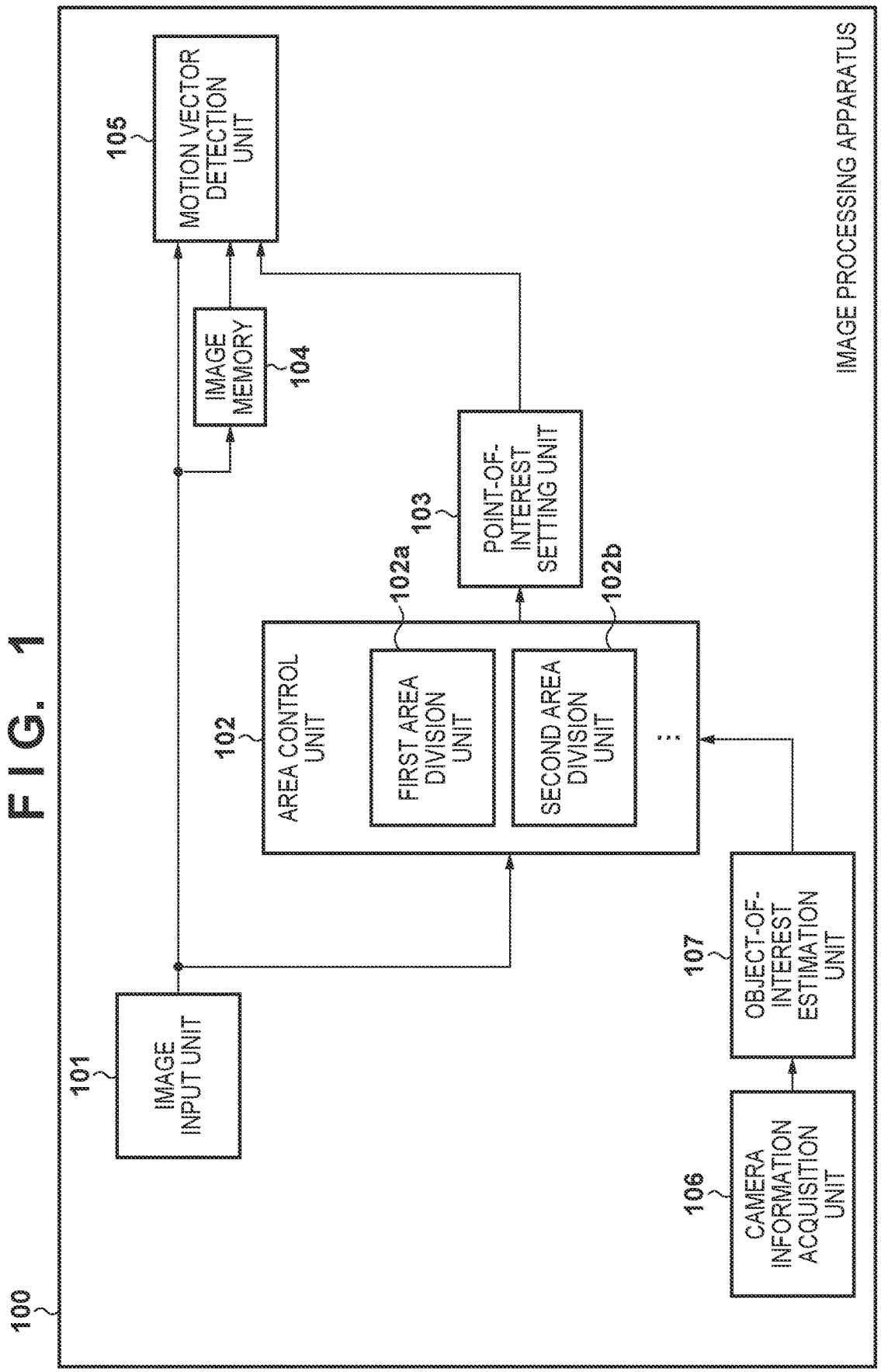
FIG. 1 is a block diagram showing the configuration of an image processing apparatus according to a first embodiment of the present invention.
Figure 4A:
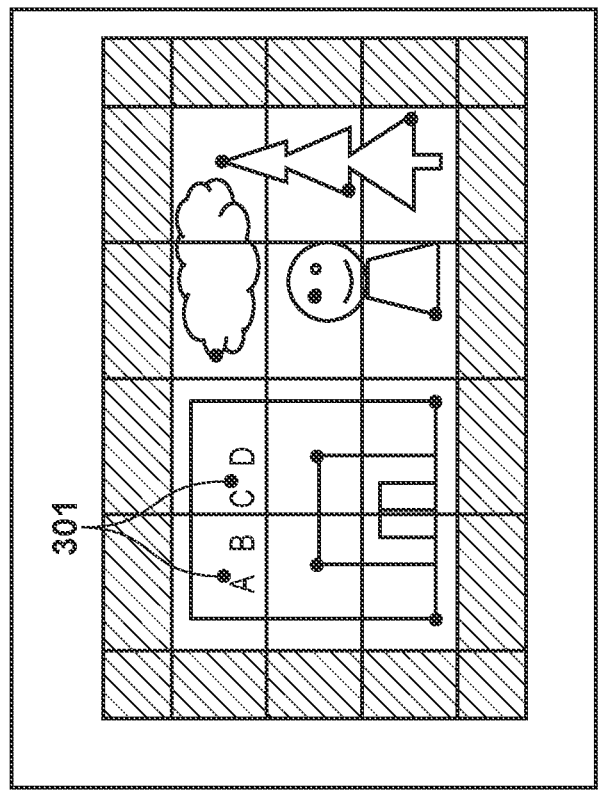
FIGS. 4A and 4B are diagrams for describing area division of an image and setting of points of interest.

FIG. 1 is a block diagram showing the configuration of an image processing apparatus according to a first embodiment of the present invention. In FIG. 1, an image input unit 101 inputs an image. An area control unit 102 includes one or more (a plurality of types) area division units 102a, 102b, . . . , and outputs division information for dividing, into a plurality of image areas, an image that has been input by the image input unit 101, based on output of an object-of-interest estimation unit 107 that will be described later. The image areas may have any shape, but in this embodiment, an image is divided into a lattice shape as shown in FIG. 4A. In addition, the one or more area division units 102a, 102b, . . . are independent from each other, and can perform different division setting.

A point-of-interest setting unit 103 sets a predetermined number of points of interest for each image area based on division information (e.g., a division size, a number of division, and coordinates,) from the area control unit 102. An image memory 104 temporarily stores an image of 1 frame or an image of a plurality of frames that has been input by the image input unit 101. A motion vector detection unit 105 detects motion vectors in an image that has been input from the image input unit 101 and the image memory 104, based on points of interest that are output from the point-of-interest setting unit 103, for example, through template matching.

A camera information acquisition unit 106 acquires camera information required for estimation of a shooting situation. The camera information includes a shooting mode, main subject information, a shutter speed, a focal length, depth information, inertial sensor information, user instruction information, and the like. The object-of-interest estimation unit 107 estimates whether the user is focused on a background or a subject during shooting, and whether a focus is to be placed on the background or the subject to perform motion vector detection, based on camera information obtained from the camera information acquisition unit 106.

Figure 2:
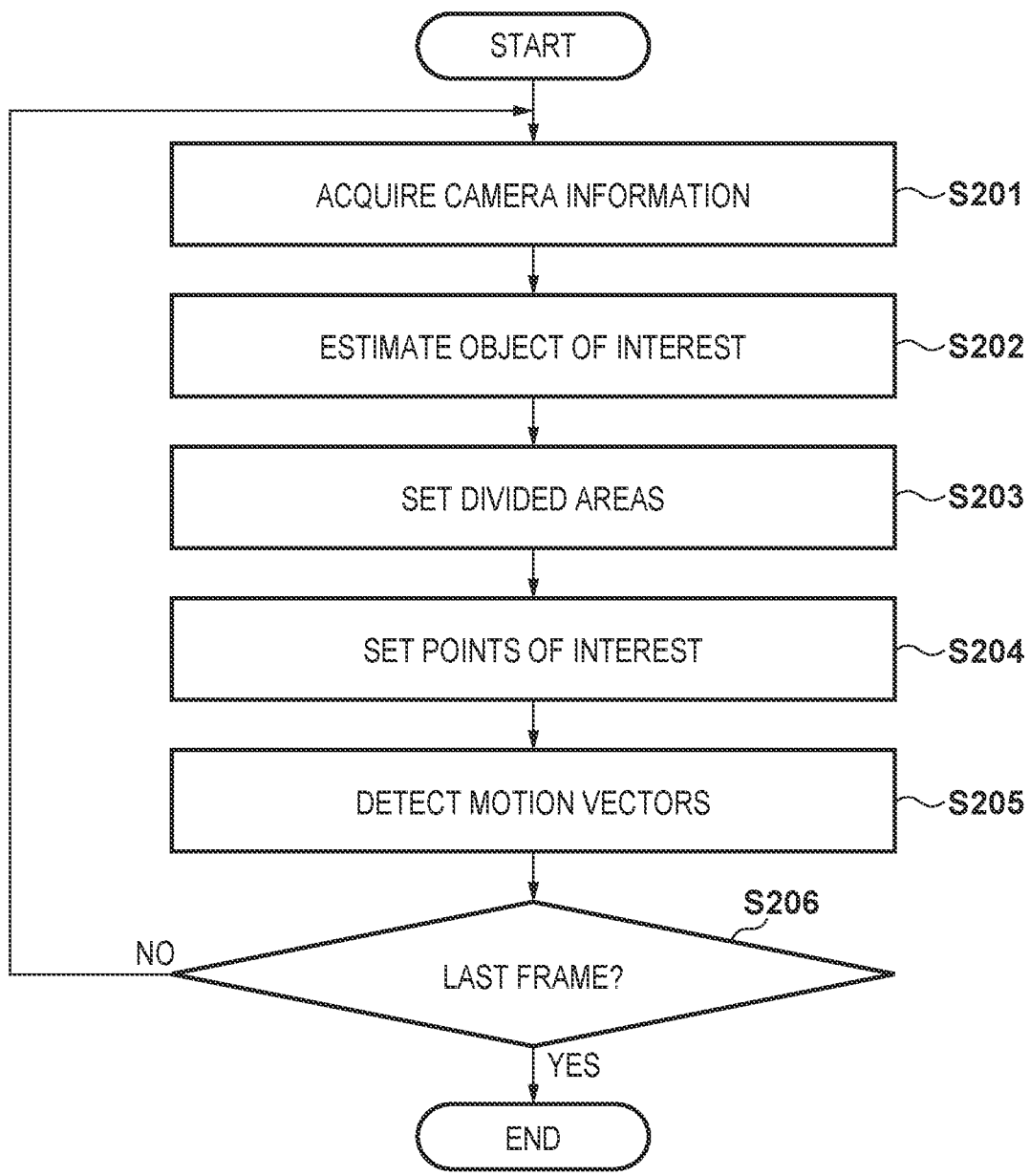
FIG. 2 is a flowchart for describing image processing that is performed in the first embodiment.

Operations of an image processing apparatus 100 configured as described above will be described in detail with reference to a flowchart shown in FIG. 2.

In step S201, the camera information acquisition unit 106 acquires camera information required for estimation of a shooting situation. As examples of camera information, a shooting mode, main subject information, a shutter speed, a focal length, depth information, inertial sensor information, and user instruction information are used.

The main subject information includes a degree of person-like appearance of a main subject, the size of the main subject, and movement of the main subject, for example. For example, in a case where a main subject is a face of a person, the degree of person-like appearance and the size of the main subject can be obtained using a known face detection technique in which information regarding the color and the outline of a main subject is used. Movement of the main subject can be obtained from motion vectors that are detected between image frames using a motion vector detection technique to be described later. In addition, the depth information can be detected using a focus detection sensor, or from a captured image using known SfM (Structure from Motion).

In step S202, the object-of-interest estimation unit 107 estimates a shooting situation based on the camera information acquired in step S201, and estimates whether a focus is to be placed on the background or the main subject to perform motion vector detection.

Here, a method for estimating an object of interest based on camera information will be described. Here, first, a background degree indicating a degree to which the object of interest is a background and a subject degree indicating a degree to which the object of interest is a main subject are calculated for each piece of camera information. The background degree and the subject degree are expressed as numerical values such that the total of the background degree and the subject degree is 1. Note that only one of the background degree and the subject degree may be calculated.

Regarding a shooting mode, for example, in the case of a portrait mode, there is a high possibility that shooting is being performed with a focus on a person (=subject), and thus the subject degree is set to be high (e.g., 0.9), and the background degree is set to be low (e.g., 0.1). On the other hand, in the case of a scenery mode, there is a high possibility that shooting is being performed with a focus on a scenery, and thus the subject degree is set to be low (e.g., 0.1), and the background degree is set to be high (e.g., 0.9). The background degree and the subject degree can be determined by envisioning a shooting situation that is highly possible according to a shooting mode in this manner.

Regarding a degree of person-like appearance of a main subject, the more a main subject appears like a person, the higher the possibility that shooting is being performed with a focus on a subject is, and thus the subject degree is set to be high (e.g., 0.7), and the background degree is set to be low (e.g., 0.3). Regarding the size of a main subject, the larger a main subject is, the higher the possibility that shooting is being performed with a focus on a subject is, and thus the subject degree is set to be high (e.g., 0.8), and the background degree is set to be low (e.g., 0.2).

Regarding movement of a main subject, the smaller the movement of a main subject is, the higher the possibility that shooting is being performed with a focus on a subject is, since it is envisioned that the camera is held in an attempt to capture the subject, and thus the subject degree is set to be high (e.g., 0.6), and the background degree is set to be low (e.g., 0.4). Regarding a shutter speed, the higher a shutter speed is, the higher the possibility that shooting is being performed with a focus on a subject that is moving at a high speed is, and thus the subject degree is set to be high (e.g., 0.7), and the background degree is set to be low (e.g., 0.3). FIG. 3 is a diagram showing a table in which the relationship between camera information and an object of interest that have been described above is outlined. Numerical values in parentheses indicate examples of the above-described background degree/subject degree.

Next, regarding a focal length and depth information, it is difficult to understand an intention of the photographer only from either a focal length or depth information. In view of this, an example of a method for estimating an object of interest by combining a focal length and depth information will be described.

If a focal length f[mm] and a distance d[mm] to a main subject (depth information) are given, letting the size of a main subject on the imaging plane be X [mm], an actual size Y[mm] of the main subject can be calculated using Expression 1 below.

$$Y = (d/f) \cdot X \quad (1)$$

If the actual size of the main subject is found, an intention of the photographer can be understood from the size of the main subject on the imaging plane and the relationship with the focal length. For example, in the case where, although the actual size of a main subject is small, the size of the main subject on the imaging plane is large, and the focal length is long, it is determined that an intense focus is placed on the main subject. Therefore, for a smaller actual size of the main subject, a larger size of the main subject on the imaging plane, and a longer focal length, the subject degree is set to be higher, and the background degree is set to be lower.

It is also difficult to understand an intention of the photographer only from inertial sensor information. In view of this, an example of a method for estimating an object of interest by combining inertial sensor information and movement information of a subject will be described. In the case where the object of interest of the photographer is a subject, the camera is moved in an attempt to place the subject at a certain position in the screen, and thus movement of the subject on the screen is relatively small compared with the movement of the camera. Thus, the smaller the moving amount of the subject on the screen is compared to the moving amount of the camera between frame images that is obtained from inertial sensor information, the higher the possibility that shooting is being performed with a focus on the subject is, since it is envisioned that the camera is held in an attempt to capture the subject, and thus the subject degree is set to be higher, and the background degree is set to be lower.

In the case where there are a plurality of pieces of camera information that can be used for estimating an object of interest, it is sufficient that weighting addition is performed on background degrees and subject degrees obtained for the respective pieces of the camera information so as to calculate a final background degree and subject degree. It is sufficient that weights are set based on the reliability of the information sources, for example.

Description will be given with reference to the example in FIG. 3. Background degrees that are respectively obtained from a shooting mode, a degree of person-like appearance of a main subject, the size of the main subject, movement of the main subject, and a shutter speed are indicated by Da, Db, Dc, Dd, and De, and the weights are indicated by Ga, Gb, Gc, Gd, and Ge. A final background degree D can be calculated through weighting addition using Expression 2 below.

$$D = Ga \times Da + Gb \times Db + Gc \times Dc + Gd \times Dd + Ge \times De \quad (2)$$

For example, assume that the weights Ga=0.3, Gb=0.2, Gc=0.2, Gd=0.1, and Ge=0.2. Here, the weights are normalized such that the total of the weights is 1. Now, if the shooting mode is a scenery mode (Da=0.9), the degree of person-like appearance of the main subject is high (Db=0.3), the size of the main subject is small (Dc=0.8), movement of the main subject is small (Dd=0.4), and the shutter speed is slow (De=0.7), D=0.6 holds according to Expression 2. A final subject degree can be calculated in the same manner.

In the case where the reliability of the information sources is the same or unknown, it is sufficient that all the weights are set to be the same.

Note that in the case where information regarding an instruction made by the user is used as camera information, a background degree and a subject degree can be determined without making estimation, by degrees of interest for a background and a subject being instructed by the user, for example.

In step S203, the area control unit 102 controls the one or more area division units 102a, 102b, . . . based on the background degree and subject degree obtained in step S202 so as to divide the image into a plurality of areas.

Figure 4B:
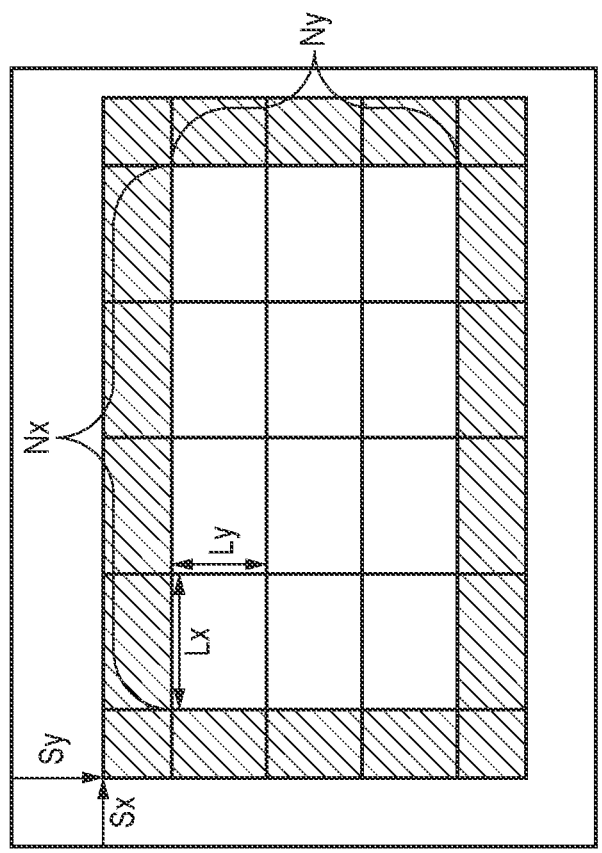

FIGS. 4A and 4B are diagrams showing control parameters of area division units. In FIG. 4A, blank rectangle areas are point-of-interest setting areas for setting points of interest, and periphery areas indicated by hatching lines are provided in the periphery of the point-of-interest setting areas. A template area and a search area used for motion vector detection to be described later may protrude from the point-of-interest setting areas depending on the positions of points of interest that are set, and the periphery areas are extra image areas provided for the protruding portion of the template area and search area.

Control parameters of an area division unit include Sx and Sy that indicate the horizontal and vertical positions of a point-of-interest setting area, Nx and Ny that indicate the horizontal number and vertical number of areas, and Lx and Ly that indicate the horizontal size and vertical size, for example. Note that, here, for easy control, the horizontal sizes of the areas are uniform, and the vertical sizes of the areas are uniform, but a configuration may be adopted in which the horizontal size and vertical size of each of the areas can be independently set.

Next, a method for controlling these control parameters of the area control unit 102 based on a background degree and a subject degree will be described. Here, an example will be described in which the two independent area division units 102a and 102b are controlled. For example, control is performed such that a first area division unit 102a is made suitable for motion vector detection of a background, and a second area division unit 102b is made suitable for motion vector detection of a main subject.

Note that three or more area division units may be provided. For example, in the case where there are three area division units, it is sufficient that control is performed such that a third area division unit is made suitable for motion vector detection for a subject other than a main subject, in addition to the background and the main subject.

In addition, an area division unit that can independently set a plurality of horizontal sizes and vertical sizes of areas as in FIG. 5 may be provided. In the example in FIG. 5, a horizontal number Nx1 and a vertical number Ny1 of divided areas having a horizontal size Lx1 and a vertical size Ly1 are used as divided areas suitable for motion vector detection for a background. Also, a horizontal number Nx2 and a vertical number Ny2 of divided areas having a horizontal size Lx2 and a vertical Ly2 are used as divided areas suitable for motion vector detection for a main subject.

The more the number of point-of-interest setting areas (the number of points of interest) increases, the more a processing time required for motion vector detection increases, and a memory capacity and a memory band for holding motion vector information also increase. It is necessary to satisfy these restrictions on the system load in order to perform motion vector detection on a camera system in real time, and thus there is an upper limit to the number of point-of-interest setting areas.

Figure 6:
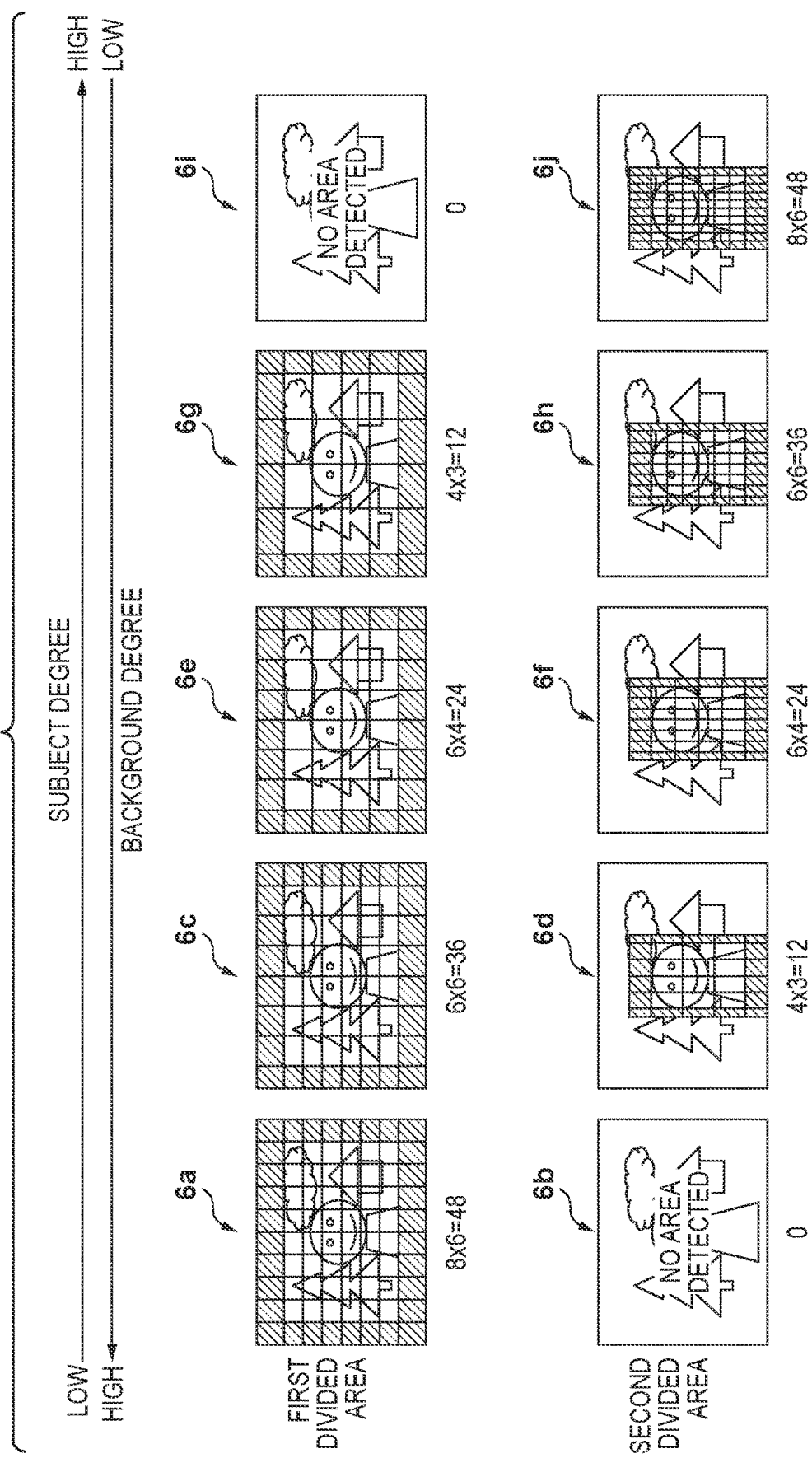
FIG. 6 is a diagram for describing area control that is based on an object of interest.
Figure 7A:
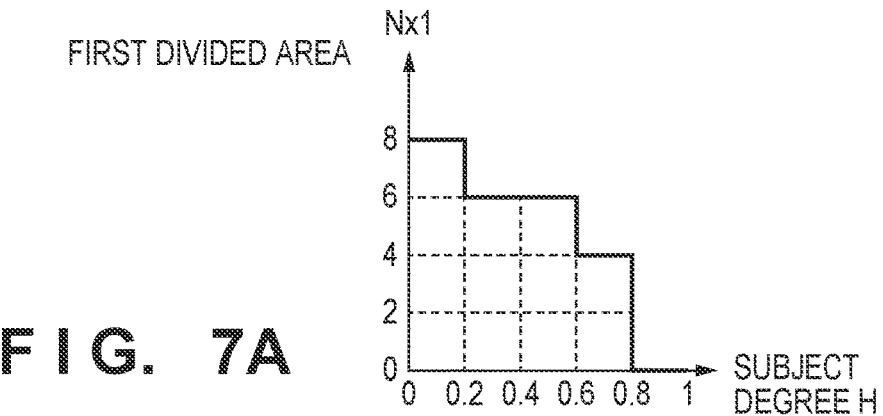
FIGS. 7A to 7H are diagrams showing change in a control parameter in area control that is based on an object of interest.
Figure 7B:
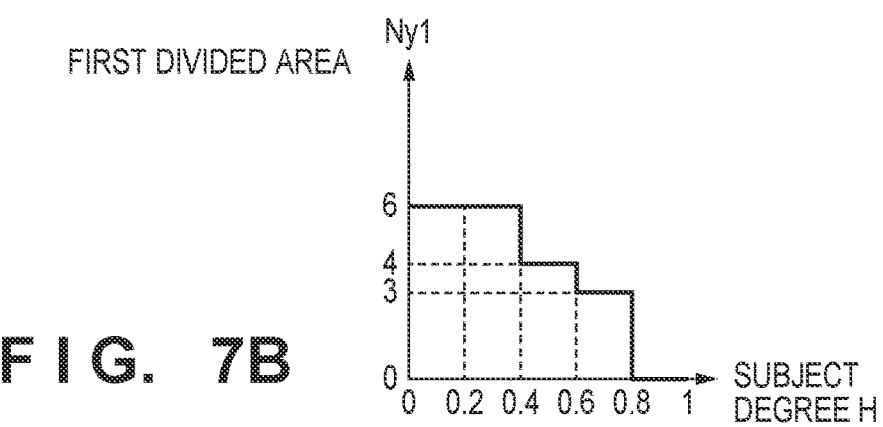
Figure 7C:
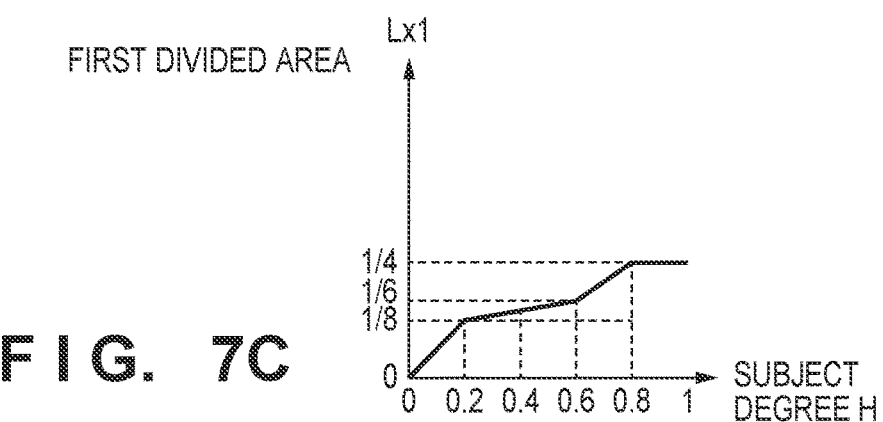
Figure 7D:
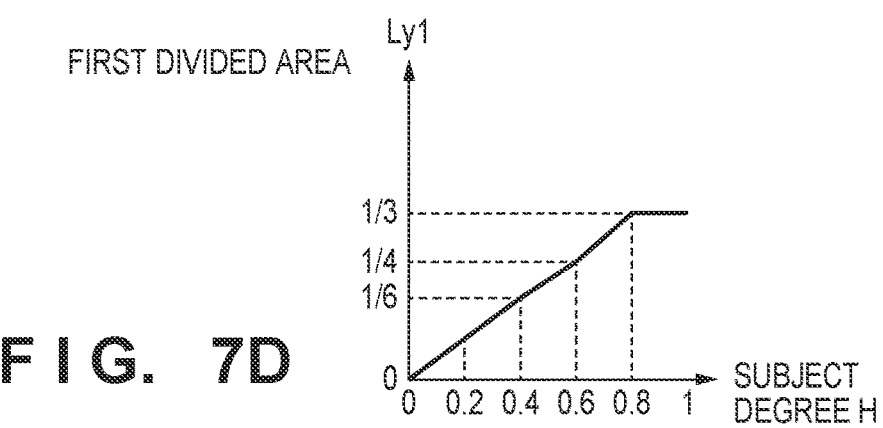
Figure 7E:
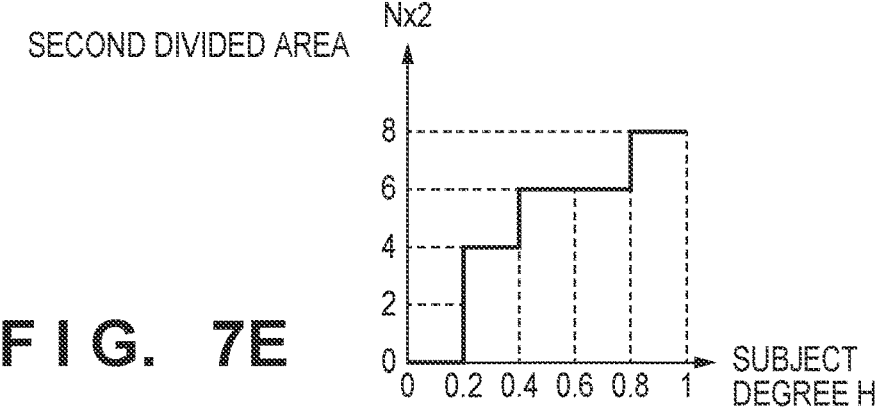
Figure 7F:
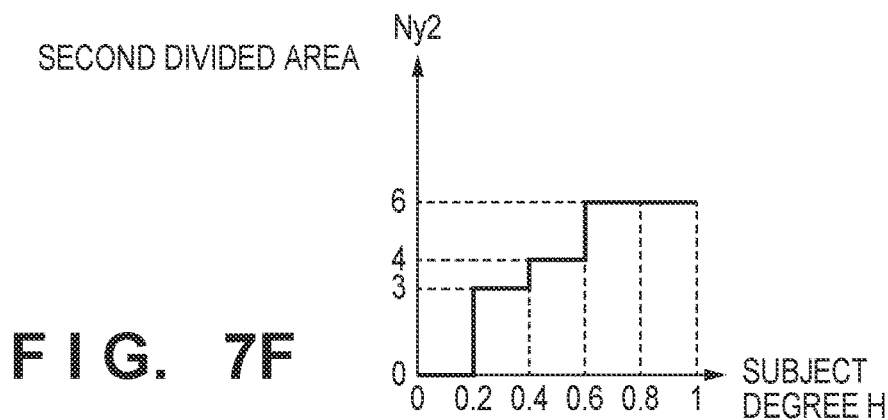
Figure 7G:
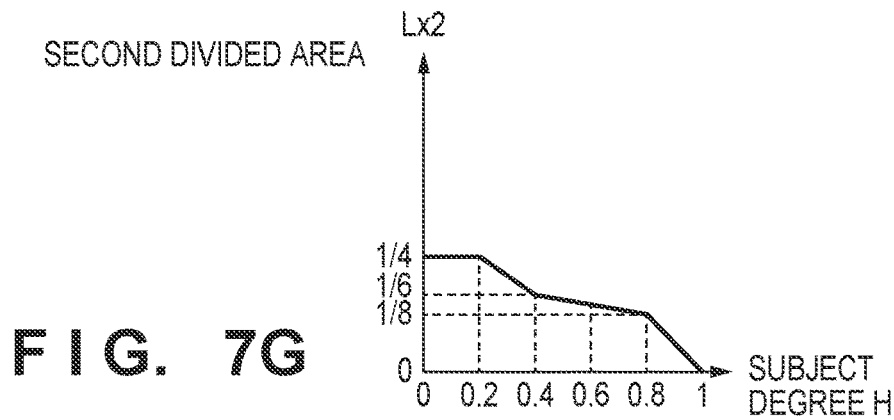
Figure 7H:
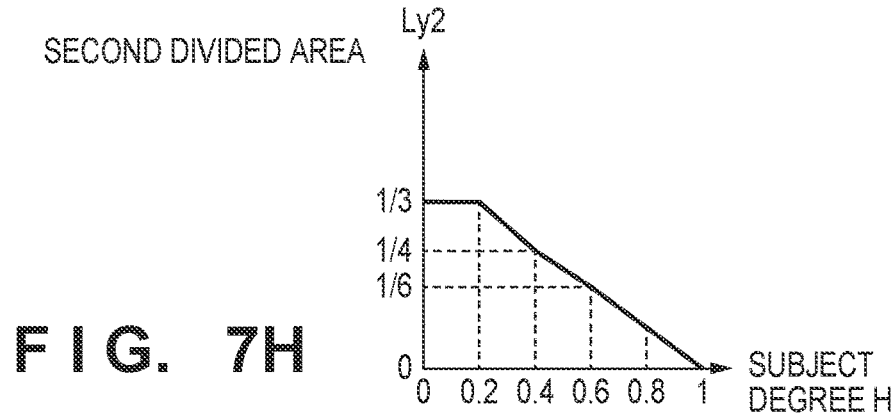

In examples shown in FIG. 6 in which two independent first and second area division units 102a and 102b are controlled, an upper limit for the number of point-of-interest setting areas is set to 48 (fixed), and one point of interest is set in each area. Note that the upper limit of the number of point-of-interest setting areas may dynamically change within a range in which restrictions on the system load are satisfied. In FIG. 6, the subject degree increases and the background degree decreases from the left side toward the right side.

In the case where the subject degree is extremely smaller than the background degree, it is envisioned that the user is focused only on the background, and thus it is sufficient that only motion vectors of the background are detected. Therefore, it is desirable that area division that is performed by the first area division unit 102a is set as in 6a in FIG. 6, and area division that is performed by the second area division unit 102b is set as in 6b in FIG. 6. In 6a in FIG. 6, a configuration is adopted in which 48 point-of-interest setting areas, which correspond to the upper limit, are all arranged over a wide area of the screen such that movement of the background is detected to a maximum extent. On the other hand, in 6b in Fi. 6, a configuration is adopted in which movement of the main subject is not detected.

Next, in the case where the subject degree is lower than the background degree, it is envisioned that the user is mainly focused on the background, but is slightly focused on the main subject as well, and thus it is sufficient that motion vectors of the background are preferentially detected. Therefore, it is desirable that area division that is performed by the first area division unit 102a is set as in 6c in FIG. 6, and area division that is performed by the second area division unit 102b is set as in 6d in FIG. 6. In 6c in FIG. 6, 36 point-of-interest setting areas that are more than half of 48 point-of-interest setting areas, which correspond to the upper limit, are arranged over a wide area of the screen, such that movement of the background is preferentially detected. On the other hand, in 6d in FIG. 6, the remaining 12 points of interest are arranged in a main subject area, such that movement of the main subject is also detected.

Next, in the case where the subject degree is approximately the same as the background degree, it is envisioned that the user is focused on the background and the main subject to the same extent, and that it is sufficient that motion vectors of both the background and the main subject are detected. Therefore, it is desirable that area division that is performed by the first area division unit 102a is set as in 6e in FIG. 6, and area division that is performed by the second area division unit 102b is set as in 6f in FIG. 6. In 6e in FIG. 6, 24 point-of-interest setting areas that are half of 48 point-of-interest setting areas, which correspond to the upper limit, are arranged over a wide area of the screen, such that the movement of the background is detected. On the other hand, in 6f in FIG. 6, the remaining 24 points of interest are arranged in a main subject area, such that the movement of the main subject is detected to the same extent as the background.

Next, in the case where the subject degree is higher than the background degree, it is envisioned that the user is mainly focused on a main subject, but is also focused on a background slightly, and thus it is sufficient that motion vectors of the main subject are preferentially detected. Therefore, it is desirable that area division that is performed by the first area division unit 102a is set as in 6g in FIG. 6, and area division that is performed by the second area division unit 102b is set as in 6h in FIG. 6. In 6g in FIG. 6, 12 point-of-interest setting areas that are less than half of 48 point-of-interest setting areas, which correspond to the upper limit, are arranged over a wide area of the screen, such that movement of the background is detected. On the other hand, in 6h in FIG. 6, the remaining 36 points of interest are arranged in a main subject area, such that movement of the main subject is preferentially detected.

Lastly, in the case where the subject degree is extremely higher than the background degree, it is envisioned that the user is focused only on a main subject, and thus it is sufficient that only motion vectors of the main subject are detected. Therefore, it is desirable that area division that is performed by the first area division unit 102a is set as in 6i in FIG. 6, and area division that is performed by the second area division unit 102b is set as in 6j in FIG. 6. In 6i in FIG. 6, detection of movement of a background is not performed. On the other hand, in 6j in FIG. 6, 48 point-of-interest setting areas, which correspond to the upper limit, are all arranged in a main subject area such that movement of the main subject is detected to the maximum extent.

In order to perform control shown in 6a-6j in FIG. 6, it is sufficient that control parameters of the first and second area division units 102a and 102b are controlled as shown in FIGS. 7A to 7H. FIGS. 7A to 7D on the left from among FIGS. 7A to 7H show control of the first area division unit 102a, and FIGS. 7E to 7H on the right show control of the second area division unit 102b. The horizontal axis in FIGS. 7A to 7H indicates subject degree, and the vertical axis indicates control parameter. The vertical axis in FIGS. 7C and 7D indicates value obtained by performing normalization such that the horizontal size of the entire point-of-interest setting areas is 1, and the vertical axis in FIGS. 7G and 7H indicates value obtained by performing normalization such that the vertical size of the entire point-of-interest setting areas is 1.

Regarding control parameters, the control parameters of the first area division unit 102a are expressed as Sx1, Sy1, Nx1, Ny1, Lx1, and Ly1 by including a suffix 1. Also, the control parameters of the second area division unit 102b are expressed as Sx2, Sy2, Nx2, Ny2, Lx2, and Ly2 by including a suffix 2.

Regarding FIGS. 7A to 7H, letting a subject degree be H, 0≤H<0.2 corresponds to the states in 6a and 6b in FIG. 6, and 0.2≤H<0.4 corresponds to the states in 6c and 6d in FIG. 6. Also, 0.4≤H<0.6 corresponds to the states in 6e and 6f in FIG. 6, 0.6≤H<0.8 corresponds to the states in 6g and 6h in FIG. 6, and 0.8≤H≤1.0 corresponds to the states in 6i and 6j in FIG. 6.

As the subject degree increases, Nx1 and Ny1 are reduced, Nx2 and Ny2 are increased, and the number of divided areas that are set in a main subject area is increased. Also, as the subject degree increases, Lx1 and Ly1 are increased, Lx2 and Ly2 are reduced, and the density of divided areas that are set in the main subject area is increased. Here, letting the upper limit of the number of point-of-interest setting areas be Nmax, control is performed so as to satisfy restriction of Nx1×Ny1+Nx2×Ny2≤Nmax. Note that, regarding control parameters SX and SY that indicate the positions of a divided area in the X and Y directions, it is sufficient that SX1 and SY1 are set as the coordinates of the upper left point of the background area, and SX2 and SY2 are set as the coordinates of the upper left point of the main subject area, for example.

In step S204, the point-of-interest setting unit 103 sets a predetermined number of points of interest, for each of the image areas obtained by dividing the image in step S203. It is sufficient that feature points in each area are used as points of interest, for example. FIG. 4B shows a state where one feature point 301 is extracted for each of image areas of an image divided into a lattice shape.

A known method may be used as a method for extracting feature points, and, for example, a case will be described in which a Harris corner detector or a Shi and Tomasi technique is used. In these techniques, a luminance value of a pixel (x, y) of an image is indicated by I(x, y), and an autocorrelation matrix H expressed as Expression 3 is generated from Ix and Iy obtained as a result of applying a horizontal and vertical primary differential filter to the image.

$$H = G * \begin{pmatrix} Ix^2 & IxIy \\ IxIy & Iy^2 \end{pmatrix} \quad (3)$$

In Expression 3, G indicates smoothing that is performed through Gaussian distribution as indicated in Expression 4.

$$G(x, y) = \frac{1}{2\pi\sigma^2} \exp\left(-\frac{x^2 + y^2}{2\sigma^2}\right) \quad (4)$$

A Harris detector extracts, as a feature point, a pixel whose feature amount is large, according to a feature evaluation equation expressed as Expression 5.

$$\text{Harris} = \det(H) - \alpha(\text{tr}(H))^2 - (\alpha = 0.04 \text{ to } 0.15) \quad (5)$$

In Expression 5, det indicates a determinant, and tr indicates the sum of diagonal components. In addition, α is a constant, and it is experimentally considered to be preferable to take a value of 0.04 to 0.15.

On the other hand, in a Shi and Tomasi technique, a feature evaluation equation expressed as Expression 6 is used.

$$\text{Shi and Tomasi} = \min(\lambda 1, \lambda 2) \quad (6)$$

Expression 6 indicates that one of unique values λ1 and λ2 of the autocorrelation matrix H in Expression 3 that is smaller is used as a feature amount. Also in the case of using a Shi and Tomasi technique, a pixel whose feature amount is large is extracted as a feature point. Feature amounts of pixels are calculated using Expression 5 or Expression 6 for each of the image areas acquired by dividing an image, and a predetermined number of pixels are extracted as feature points from pixels whose feature amount is large, and are set as points of interest.

In step S205, motion vector detection is performed using the points of interest that were set in step S204. The motion vector detection unit 105 detects motion vectors through template matching.

Figure 8B:
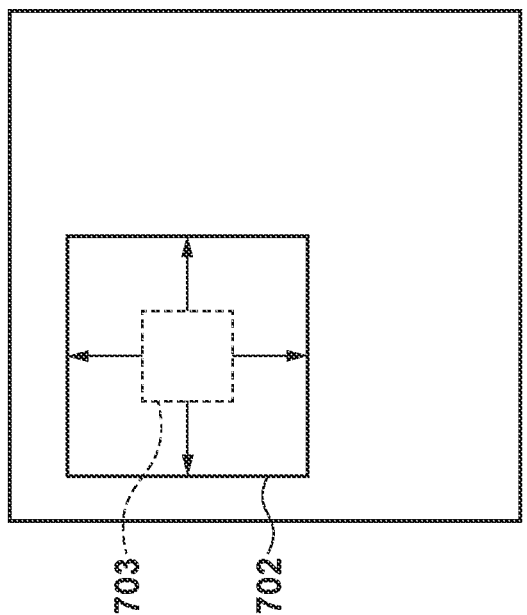
FIGS. 8A and 8B are diagrams for describing template matching.
Figure 8A:
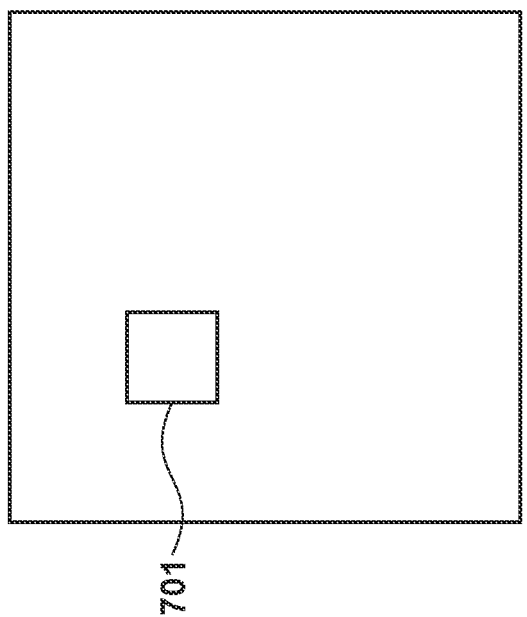

FIGS. 8A and 8B are diagrams showing an outline of template matching. FIG. 8A shows a base image that is one of two vector detection images, and FIG. 8B shows a reference image that is the other. Here, a frame image held in the image memory 104 is used as a base image, and image data that is directly input from the image input unit 101 is used as a reference image, and thereby motion vectors from a past frame image to the present frame image are calculated. Note that a base image and a reference image may be replaced with each other, and in this case, it is indicated that motion vectors from the present frame image to a past frame image are calculated.

The motion vector detection unit 105 arranges a template area 701 in the base image and a search area 702 in the reference image, and calculates a correlation value between these template area 701 and search area 702. Here, it is sufficient that the template area 701 is arranged centered on the points of interest that were set in step S204, and the search area is arranged so as to have a predetermined size and thereby equally surround the template area horizontally and vertically.

In this embodiment, Sum of Absolute Difference (hereinafter, abbreviated as SAD) is used as a method for calculating a correlation value. An equation for calculating SAD is expressed as Expression 7.

$$S\_SAD = \Sigma_i \Sigma_j |f(i,j) - g(i,j)| \qquad (7)$$

In Expression 7, f(i,j) indicates a luminance value at coordinates (i,j) within the template area 701. Also, g(i,j) indicates a luminance value at coordinates of each position within an area (hereinafter, referred to as a correlation value calculation area) 703 in which a correlation value is to be calculated within the search area 702. In SAD, a correlation value S_SAD is obtained by calculating the absolute values of the differences between the luminance values f(i,j) and g(i,j) within the template area 701 and the correlation value calculation area 703, and obtaining the sum of the absolute values. A smaller value of the correlation value S_SAD indicates a higher similarity in texture between the template area 701 and the correlation value calculation area 703. Note that a method other than SAD may be used for calculating a correlation value, and Sum of Squared Difference (SSD) or Normalized Cross Correlation (NCC) may be used, for example.

Figure 9B:
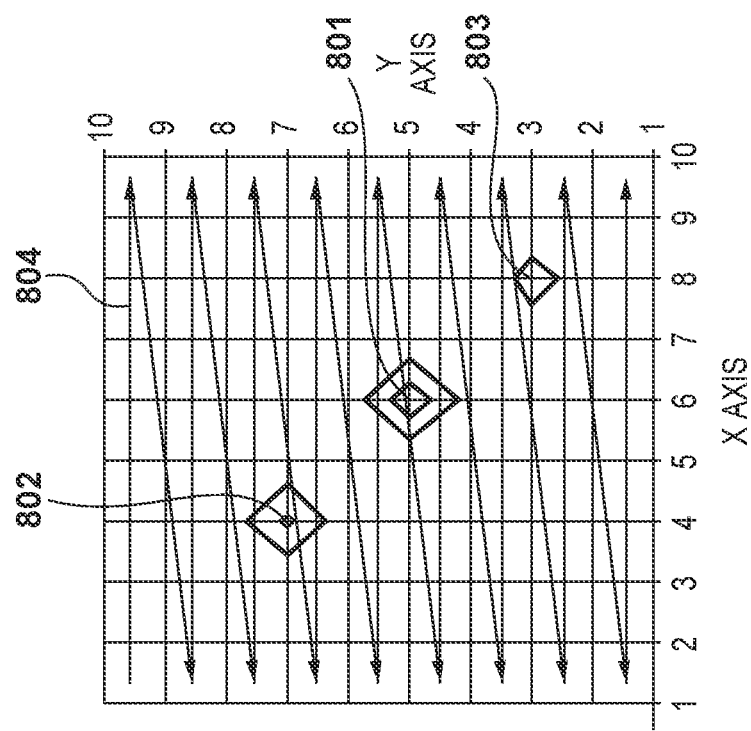
FIGS. 9A and 9B are diagrams for describing a correlation value map.

The motion vector detection unit 105 moves the correlation value calculation area 703 in the entire search area 702, and calculates correlation values. Accordingly, correlation value maps as shown in FIGS. 9A and 9B are generated for the search area 702.

Figure 9A:
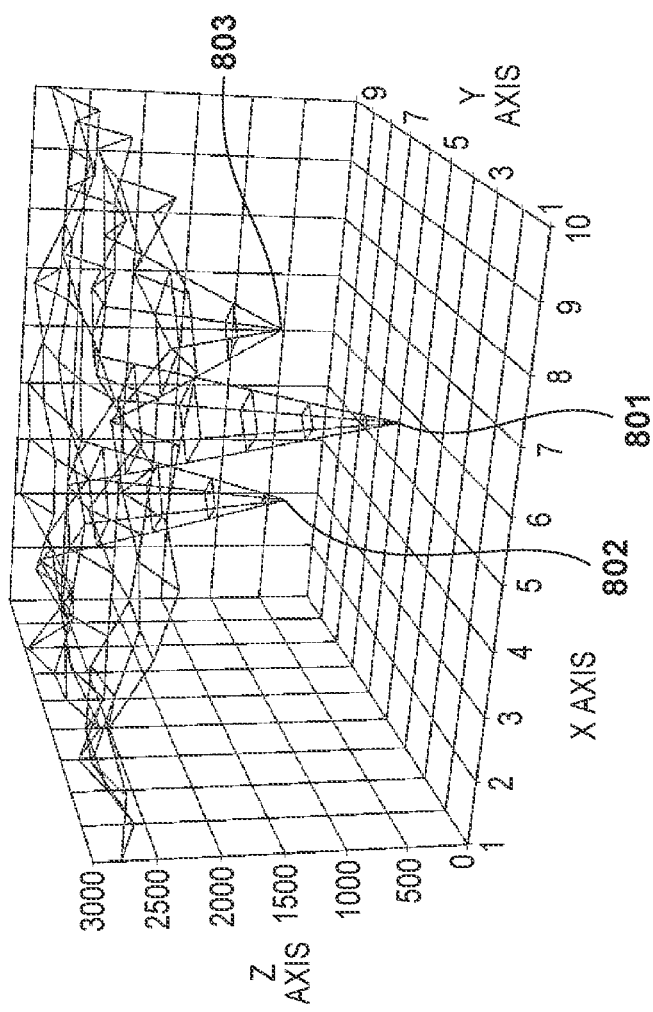

FIG. 9A shows a correlation value map calculated on the coordinate system of the search area 702, where the X axis and the Y axis indicate correlation value map coordinates, and the Z axis indicates the magnitude of a correlation value of each coordinate. In addition, FIG. 9B shows contour lines in FIG. 9A. In FIGS. 9A and 9B, it can be determined that the smallest correlation value is a minimum value 801 (a maximum value of correlation), and an area in the search area 702 in which the minimum value 801 was calculated has a texture very similar to that of the template area 701. Reference numeral 802 indicates the second minimum value, and reference numeral 803 indicates the third minimum value, these indicate that there are the second and third most similar textures after the minimum value 801.

As described above, the motion vector detection unit 105 calculates a correlation value between the template area 701 and the search area 702, and determines a position in the correlation value calculation area 703 at which this value is the smallest. This makes it possible to specify a destination on the reference image, of the template area 701 that is on the base image. Also, it is possible to detect a motion vector whose direction and size are a direction and a moving amount toward the destination on the reference image that is based on the position of the template area on the base image.

FIGS. 10A to 10D are diagrams showing an example of a motion vector detection result in this embodiment. In this example, in step S202 in FIG. 2, the background degree and the subject degree are estimated to be approximately the same, and in step S203, area division that is performed by the first area division unit 102a is set as in 6e in FIG. 6, and area division that is performed by the second area division unit 102b is set as in 6f in FIG. 6.

Figure 10A:
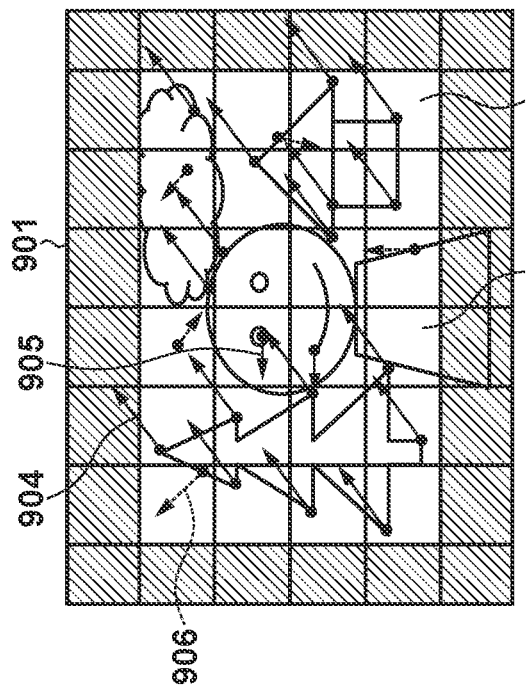
FIGS. 10A to 10D are diagrams showing an example of a motion vector detection result.

FIG. 10A shows motion vectors detected based on points of interest that were set in divided areas (6e in FIG. 6) of an image divided by the first area division unit 102a. On the other hand, FIG. 10B shows motion vectors detected based on points of interest that were set in divided areas (6f in FIG. 6) of an image divided by the second area division unit 102b.

Figure 10B:
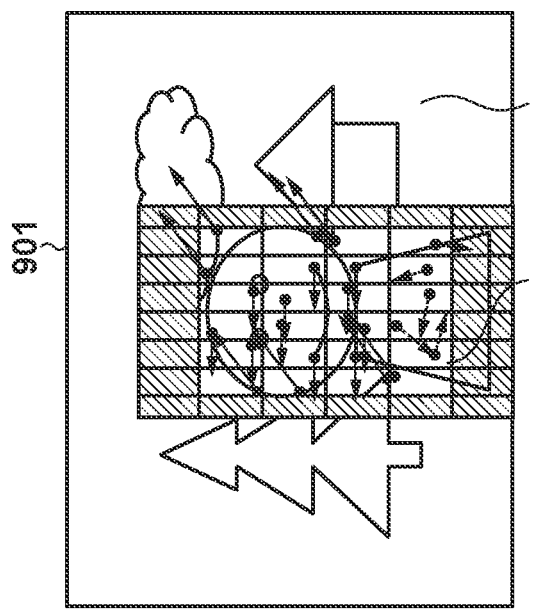

FIGS. 10A and 10B show a situation in which a background 902 and a main subject 903 that moves in a left direction are on a frame image 901, and movement of the image capturing apparatus in an upper right direction has arisen. Note that movement of the image capturing apparatus includes not only small movement of the image capturing apparatus caused by camera shake or the like, but also intentional movement caused by camera motion such as larger movement, panning, and tilting.

From among detected motion vectors, a motion vector indicating movement of the background 902 is denoted by 904, and a motion vector indicating movement of the main subject is denoted by 905. The motion vector 904 of the background has a direction and a size that are quite different from those of the motion vector 905 of the main subject. Note that motion vectors 906 indicated by broken lines are incorrectly detected motion vectors, and detailed description thereof will be given in a second embodiment.

In FIG. 10A, points of interest are set in a wide area of the screen, and thus a large number of motion vectors 904 of the background are detected, and a few motion vectors 905 of the main subject are detected in a main subject area that is a portion of the screen. In FIG. 10B, points of interest are set in the main subject area, and thus a large number of motion vectors 905 of the main subject are detected, and a few motion vectors 904 of the background are detected in a background area that is a portion of the screen. In particular, in a boundary portion between the background and the main subject, whether a motion vector of the background or the main subject is detected can change according to the intensity of texture included in the template.

Figure 10C:
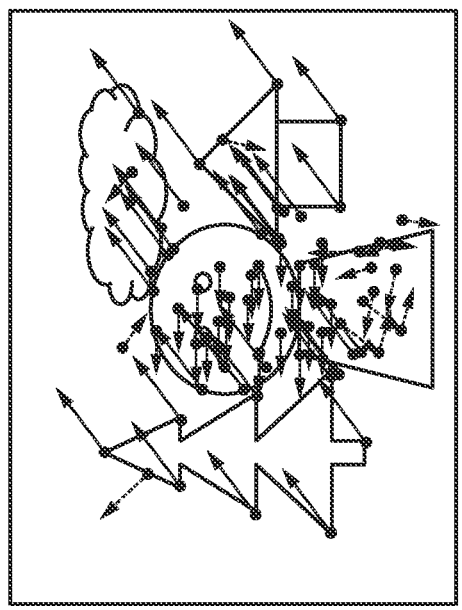

FIG. 10C shows a state where the motion vectors detected in FIG. 10A and FIG. 10B are superimposed. By setting points of interests equally in a wide area of the screen and the main subject area, both motion vectors of the background and motion vectors of the main subject are obtained.

In the last step S206, the image processing apparatus 100 determines whether or not processing to the last frame is complete. If processing to the last frame is not complete, the procedure returns to step S201.

As describe above, in this embodiment, a shooting situation is estimated using camera information, and whether a focus is to be placed on a background or a main subject to perform motion vector detection is estimated. After that, by controlling divided areas so as to acquire point-of-interest distribution suitable for the estimation result, movement of the object of interest of the user can be preferentially detected.

Second Embodiment

Figure 11:
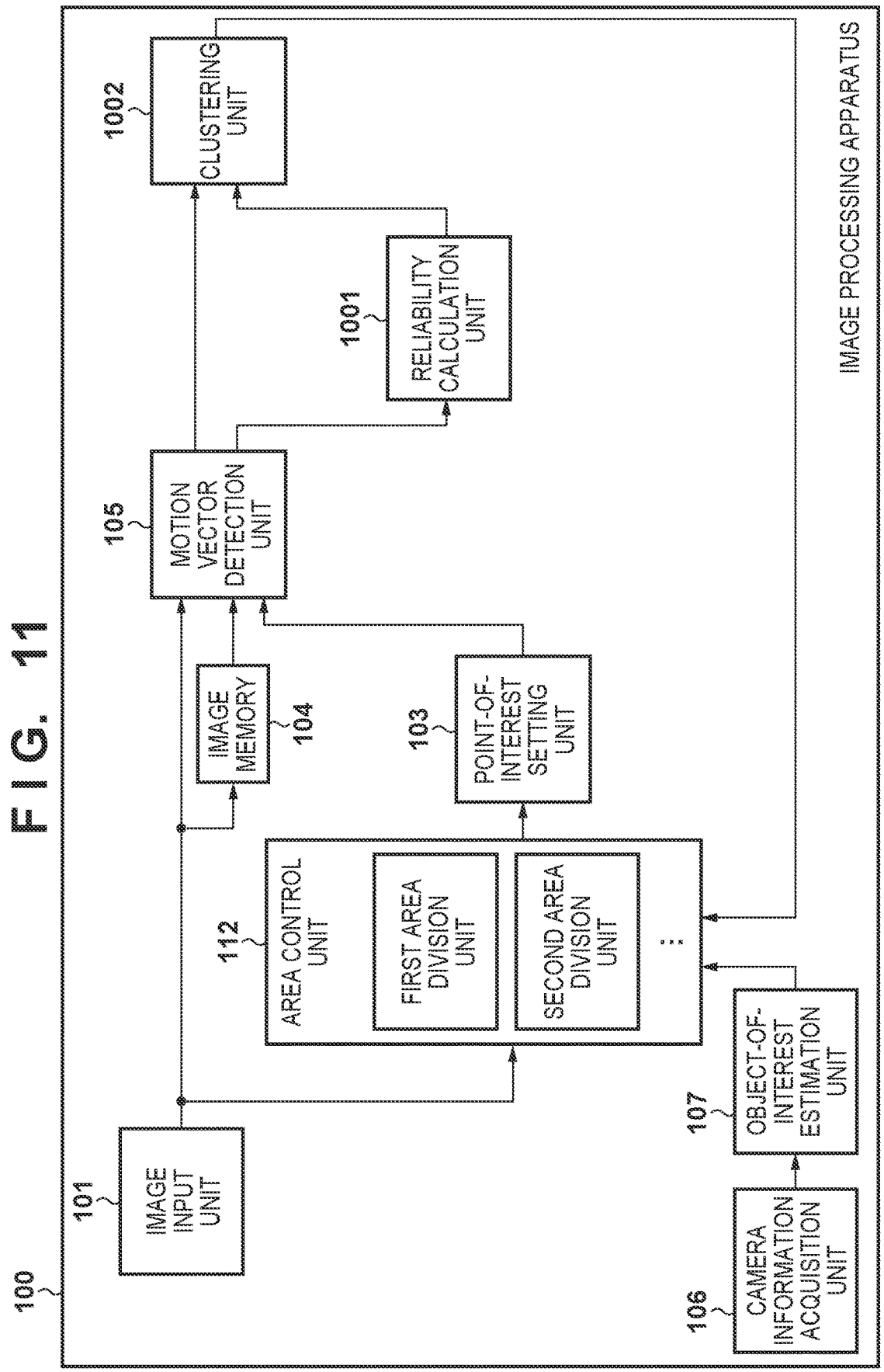
FIG. 11 is a block diagram showing the configuration of an image processing apparatus according to a second embodiment of the present invention.

FIG. 11 is a diagram showing the configuration of an image processing apparatus of a second embodiment of the present invention. In FIG. 11, the same reference numerals as those in FIG. 1 are given to the same constituent elements as those shown in FIG. 1. The image processing apparatus in this embodiment has a reliability calculation unit 1001 and a clustering unit 1002 in addition to the configuration shown in FIG. 1. In this embodiment, description of the same portions as those in the first embodiment is omitted, and only portions that perform processing different from processing in the first embodiment will be described.

In the first embodiment, divided areas are controlled according to degrees of interest for a background and a main subject. As a result, in the case where the degrees of interest for the background and the main subject are approximately the same, both motion vectors of the background and motion vectors of the main subject can be obtained as shown in FIG. 10C. However, in the example in FIG. 10C, the number of motion vectors of the background and the number of motion vectors of the main subject are not equal, and the number of motion vectors of the background is larger. This is because the ratio of points of interest at which background vectors are detected among points of interest arranged in a main subject area is large. In particular, in a boundary portion between the main subject and the background, even if there is a point of interest on the main subject, the template includes the texture of the background, and thus a background vector is likely to be detected.

In view of this, in this embodiment, by feeding back a result of analyzing actually detected motion vectors to control of divided areas, motion vector detection that is more suitable for degrees of interest for a background and a main subject is performed. This embodiment is different from the first embodiment in that an area control unit 112 receives a feedback of an output result of a clustering unit 1002.

The reliability calculation unit 1001 calculates reliabilities regarding motion vectors that is input from a motion vector detection unit 105. The clustering unit 1002 performs clustering processing on motion vectors obtained from the motion vector detection unit 105, using reliabilities obtained from the reliability calculation unit 1001. The "clustering processing" here refers to grouping, into one group, one or more motion vectors having similar directions and sizes (e.g., directions and sizes whose difference is smaller than or equal to a predetermined value) from among a plurality of motion vectors. One group is referred to as a cluster in the following description.

Figure 12:
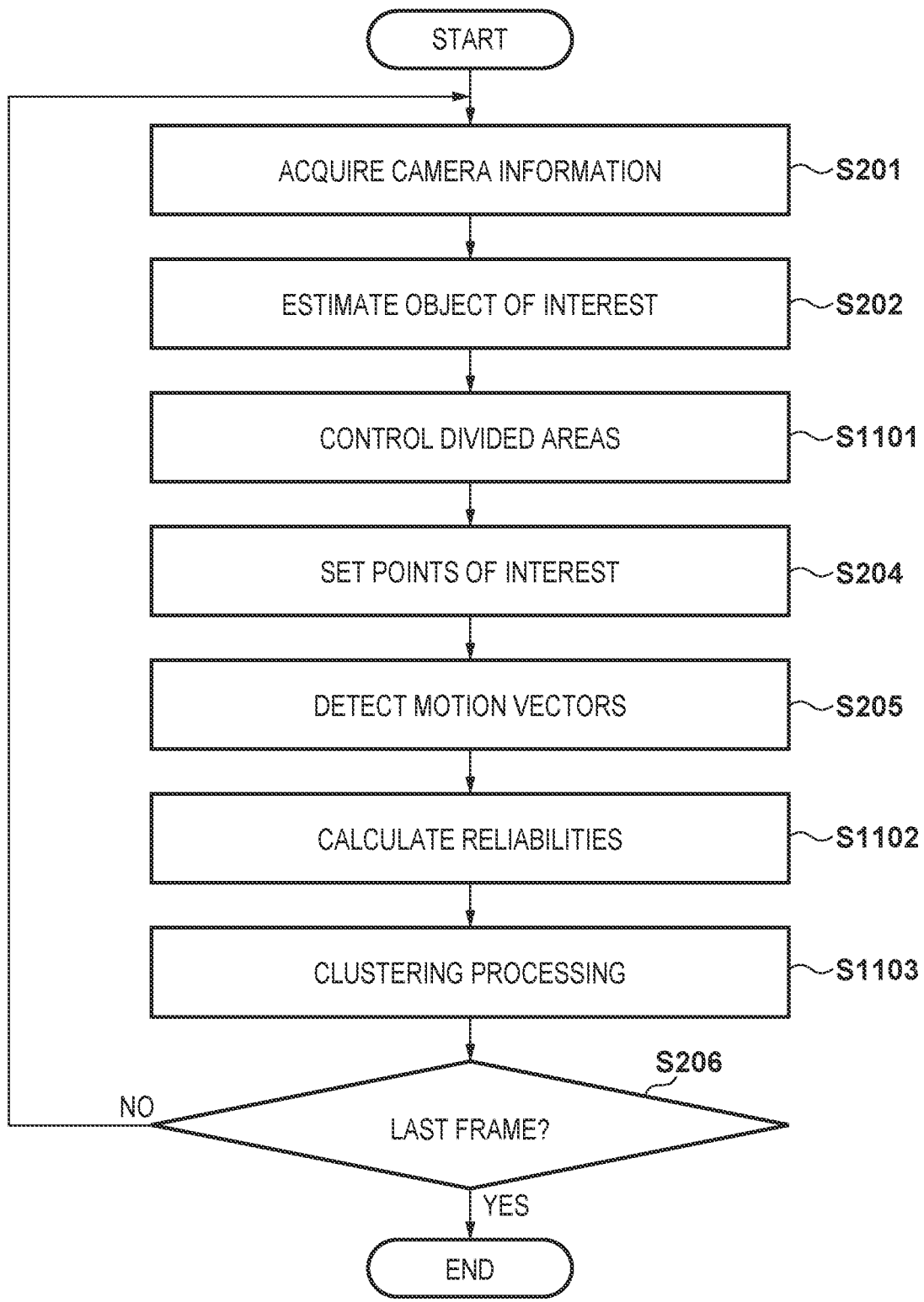
FIG. 12 is a flowchart for describing image processing that is performed in the second embodiment.

FIG. 12 is a flowchart showing operations of the image processing apparatus of the second embodiment. In FIG. 12, the same reference numerals as those in FIG. 2 are given to the same steps as those shown in FIG. 2, and a description thereof is omitted.

In step S1101, the area control unit 112 controls one or more area division units based on the background degree and the subject degree obtained in step S202 and a clustering result in step S1103 to be described later, so as to divide an image into a plurality of areas. Note that step S1103 has not been executed yet in the first frame, and thus the one or more area division units are controlled based on the background degree and the subject degree in the same manner as step S203. Processing of the second frame onward will be described after description of step S1103.

Figure 13:
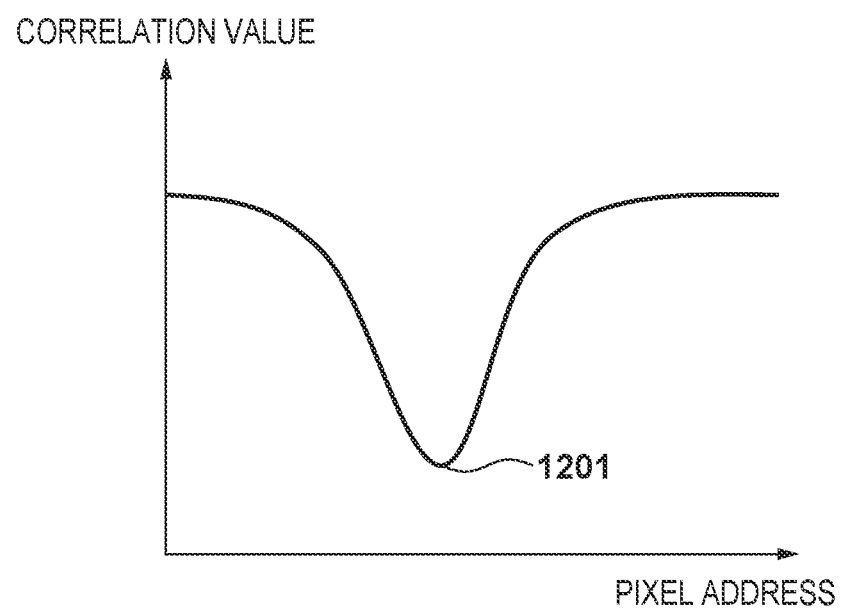
FIG. 13 is a diagram for describing a method for expressing a correlation value map.

In step S1102, the reliability calculation unit 1001 calculates reliabilities of motion vectors obtained in step S205. Reliabilities of motion vectors are calculated using a two-dimensional correlation value map. FIG. 13 shows the correlation values in the two-dimensional correlation value map in FIG. 9B, which are aligned in a raster order as indicated by arrows 804, and are expressed one-dimensionally. The vertical axis in FIG. 13 indicates correlation value, and the horizontal axis indicates pixel address uniquely defined by an X coordinate and a Y coordinate in the correlation value map. This expression in FIG. 13 will be used below to calculate reliabilities of motion vectors. Note that a position indicated by reference numeral 1201 in FIG. 13 is a position corresponding to a minimum value in FIGS. 9A and 9B.

FIGS. 14A to 14D are diagrams showing an example of an index of a correlation value that indicates the reliability of a motion vector. The horizontal axis in FIGS. 14A to 14D indicates address of a pixel, and the vertical axis indicates correlation value. In FIG. 14A, a difference Da between the minimum value and the maximum value of a correlation value is used as an index. Da indicates the range of a correlation value map, and if Da is small, it is considered that the contrast of texture is low, and it is indicated that the reliability is low.

In FIG. 14B, a ratio Db(=B/A) of difference B between the minimum value and the average value to difference A between the minimum value and the maximum value of a correlation value is used as an index. Db indicates the steepness of a correlation value peak, and if Db is small, it is considered that the similarity between a template area and a search area is low, and it is indicated that the reliability is low.

In FIG. 14C, difference Dc between the minimum value and the second local minimum value of a correlation value is used as an index. Here, reference numerals 1301, 1302, and 1303 respectively correspond to correlation values 801, 802, and 803 in FIGS. 9A and 9B. Thus, FIG. 14C indicates checking whether or not there is a local minimum value that is similar to the smallest correlation value, on a contour line in FIG. 9B. Dc indicates the periodicity of the correlation value map, and if Dc is small, it is considered that the texture is a repeated pattern, an edge, or the like, and it is indicated that the reliability is low. Note that, here, the minimum value and the second local minimum value are selected, but it is sufficient that the periodicity of the correlation value map can be determined, and thus another local minimum value may be selected.

In FIG. 14D, a minimum value Dd of a correlation value is used as an index. If Dd is large, it is considered that the similarity between a template area and a search area is low, and it is indicated that the reliability is low. Dd and the reliability are inversely proportional to each other, and thus the reciprocal (1/Dd) of Dd is set as an index.

Figure 15:
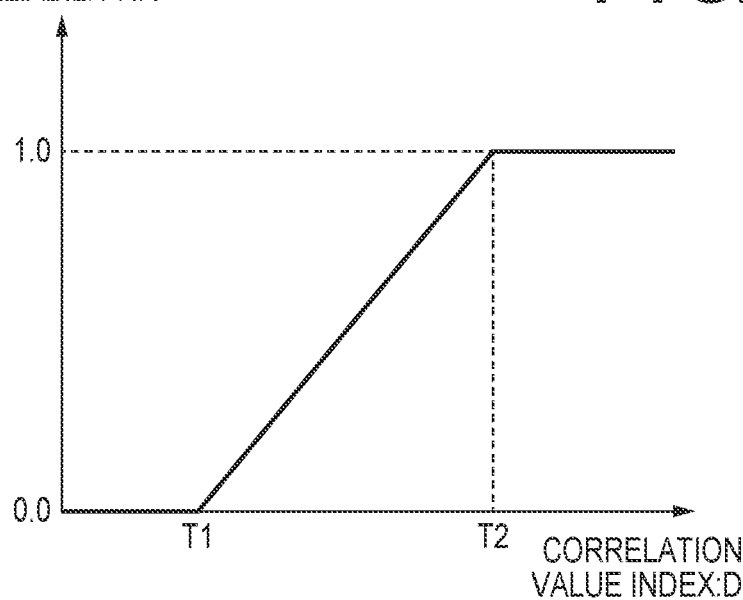
FIG. 15 is a diagram for describing a method for calculating the reliability of a motion vector.

The indices of a correlation value that have been described above can be used as reliabilities without making any change, but correlation value indices and reliabilities may be associated with each other as in FIG. 15, for example. The horizontal axis in FIG. 15 indicates correlation value index (any of Da, Db, Dc, 1/Dd above), and the vertical axis indicates reliability. In this example, two threshold values T1 and T2 are provided, and if the correlation value index is smaller than or equal to T1, reliability is 0, and if larger than or equal to T2, reliability is 1. The threshold values may be changed for each correlation value index. In addition, in the section between the threshold values T1 and T2, correlation value indices and reliabilities may be associated nonlinearly. In the following description, reliabilities obtained from correlation value indices are respectively expressed as Ra, Rb, Rc, and Rd. Here, relationship of Ra=f(Da), Rb=f(Db), Rc=f(Dc), Rd=f(Dd) is adopted.

It is sufficient that final reliability R of motion vectors is calculated by combining these Ra, Rb, Rc, and Rd. Here, a combination method that is based on weighting addition will be described. In combination using weighting addition, letting weights of Ra, Rb, Rc and Rd be Wa, Wb, Wc and Wd, respectively, the reliability R is calculated as in Expression 8.

$$R = Wa \times Ra + Wb \times Rb + Wc \times Rc + Wd \times Rd \quad (8)$$

For example, assume that the weights are Wa=0.4, Wb=0.3, Wc=0.2, and Wd=0.1. If all the reliabilities are sufficiently high, and Ra=Rb=Rc=Rd=1, R=1.0 according to Expression 8. In addition, if Ra=0.6, Rb=0.5, Rc=0.7, and Rd=0.7, R=0.6 is derived according to Expression 8.

In combination using a logic operation, letting threshold values for Ra, Rb, Rc, and Rd be Ta, Tb, Tc, and Td, respectively, the reliability R is calculated as in Expression 9 using a logical product, for example.

$$R = (Ra \geq Ta) \wedge (Rb \geq Tb) \wedge (Rc \geq Tc) \wedge (Rd \geq Td) \quad (9)$$

$\wedge$ is a symbol that indicates a logical product. If all of Ra≥Ta, Rb≥Tb, Rc≥Tc, and Rd≥Td hold, R=1 (high reliability) is derived, and otherwise R=0 (low reliability) is derived. In addition, calculation may be performed using a logical sum as in Expression 10.

$$R = (Ra < Ta) \downarrow (Rb < Tb) \downarrow (Rc < Tc) \downarrow (Rd < Td) \quad (10)$$

$\downarrow$ is a symbol that indicates a negative logical sum. If none of Ra<Ta, Rb<Tb, Rc<Tc, and Rd<Td holds, R=1 (high reliability) is derived, and otherwise R=0 (low reliability) is derived.

In step S1103, the clustering unit 1002 performs clustering processing on motion vectors obtained in step S205, using the reliabilities obtained in step S1102. Clustering processing in this embodiment will be described below. Here, clustering processing is performed with a focus on the magnitudes of motion vectors.

First, motion vectors whose reliability calculated by the reliability calculation unit 1001 is smaller than a predetermined threshold value are removed from all of the motion vectors detected by the motion vector detection unit 105. This is because it is highly possible that motion vectors whose reliability is low have been incorrectly detected, and there is a risk that incorrect cluster is formed in clustering processing to be described later.

Figure 10D:
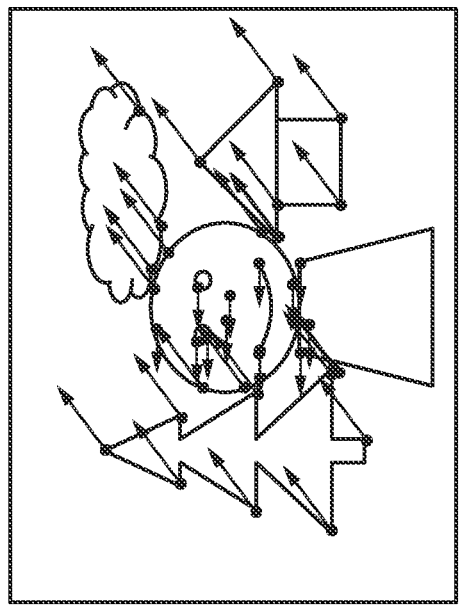
Figure 16:
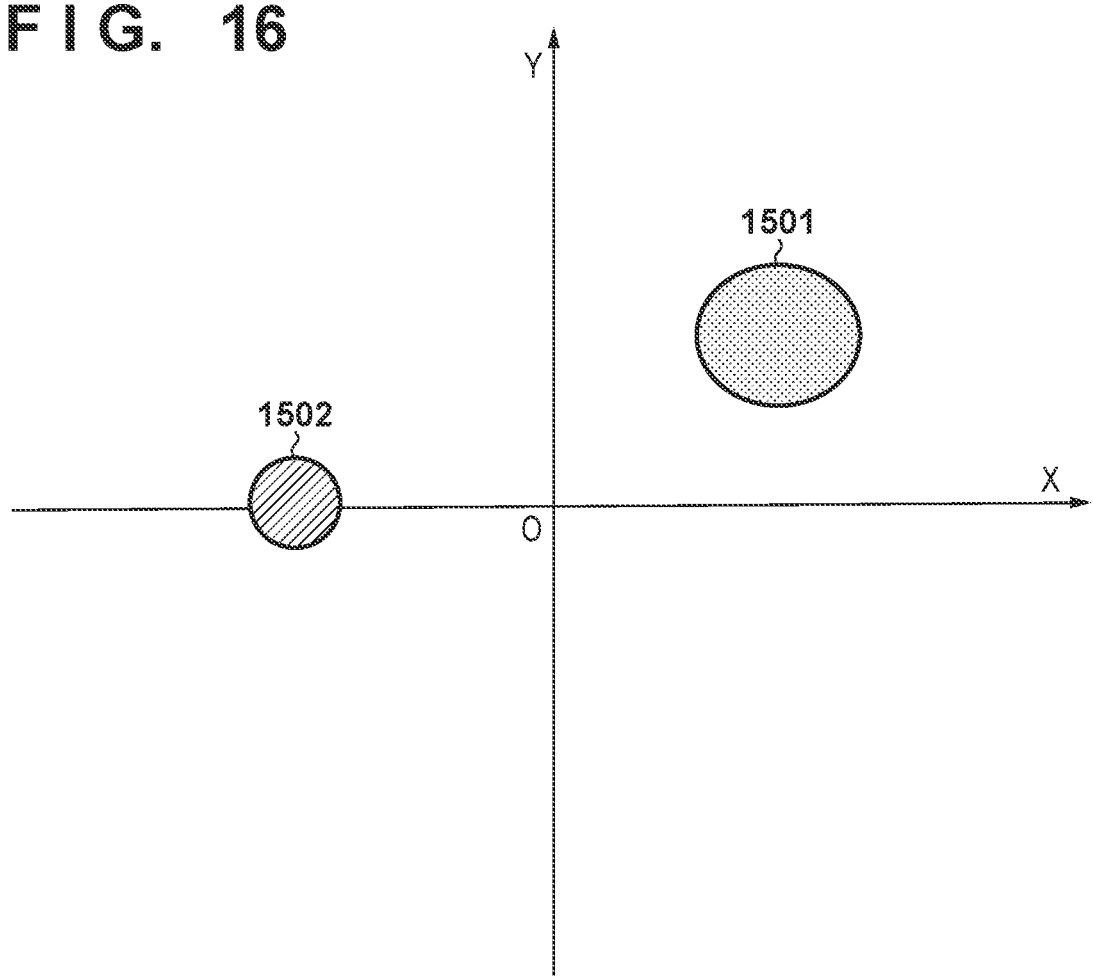
FIG. 16 is a diagram for describing clustering processing.

In FIGS. 10A to 10D, the motion vectors 906 indicated by a broken line are motion vectors whose reliability is lower than the predetermined threshold value, and that are determined as having been incorrectly detected. FIG. 10D shows a state where the motion vectors whose reliability is low have been removed from the motion vector detection result in FIG. 10C. FIG. 16 shows the sizes of motion vectors plotted on a graph (cluster map) regarding FIG. 10D above.

In FIG. 16, the horizontal axis indicates size of a motion vector in an X direction (a horizontal direction), and the vertical axis indicates size in a Y direction (vertical direction). A positive sign in the X direction and Y direction indicates that the motion vector is directed in an upward direction and right direction. Also, a negative sign indicates that the motion vector is directed in a downward direction and left direction.

By plotting motion vectors with a focus on their sizes, two or more motion vectors that have similar directions and sizes are plotted at similar positions, and as a result, clusters, which are sets of motion vectors, are formed.

In FIG. 16, a cluster 1501 is a cluster formed of the motion vectors 904 of a background (hereinafter, also referred to as a background cluster), and a cluster 1502 is a cluster formed of the motion vectors 905 of a main subject (hereinafter, also referred to as a main subject cluster). In this manner, by performing clustering processing on motion vectors, the motion vectors of the background and the motion vectors of the main subject can be separated. Accordingly, information regarding which of the background or the main subject each point of interest and motion vector belongs to can be obtained.

Clustering processing as described above is sequentially performed on a plurality of motion vectors calculated for each of sequentially generated frame images. In addition, in this embodiment, a case has been described in which clustering processing is performed with a focus on the sizes of motion vectors, but another clustering technique such as a technique in which clustering processing is performed using spatial differential values of motion vectors may be used.

After that, if it is determined in step S206 that the processing is not complete to the last frame, the procedure returns to step S201, and step S202 is executed next, and step S1101 is executed again. In step S1101 for the second time onward, the area control unit 112 controls one or more area division units based on not only the background degree and subject degree obtained in step S202 but also the result of clustering in step S1103.

A method for reflecting a clustering result on control of area division will be described below. Which of the clusters each point of interest and motion vector belong to is given from a result of clustering. A method for reflecting clustering of point of interests on area control will be described with reference to FIGS. 17A to 17C.

Figure 17A:
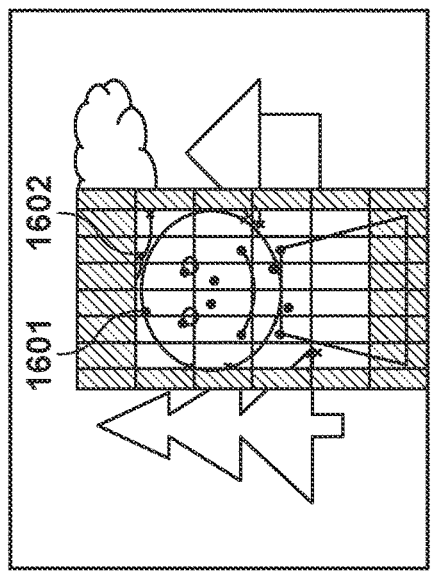
FIGS. 17A to 17C are diagrams for describing control of an area size that is based on a clustering processing result.
Figure 17B:
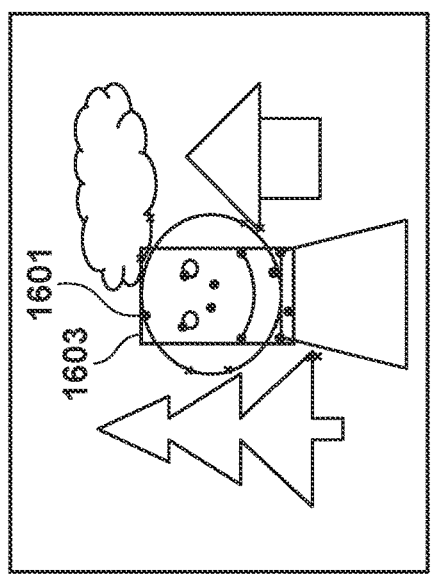
Figure 17C:
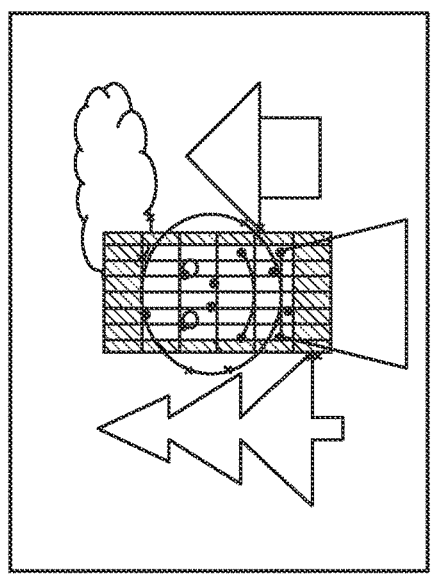

In FIG. 17A, points of interest at which the motion vectors 905 of a subject were detected in FIG. 10B are indicated by dot marks 1601, and points of interest at which the motions vector 904 of a background were detected are indicated by x marks 1602. Point-of-interest setting areas (white rectangle areas) are set in accordance with a subject area. On the other hand, FIG. 17B shows points of interest 1601 at which motion vectors of the subject were detected, and an area 1603 that contains the points of interest 1601. The area 1603 can be regarded as an area in which the motion vectors of the subject can be actually detected. In this example, the area 1603 exists inward of the subject area. Therefore, as in FIG. 17C, the area control unit 112 changes the sizes of the divided areas so as to make the point-of-interest setting areas and the area 1603 match each other.

Note that as a method for determining the area 1603, here, an area that includes all of the points of interest 1601 is used, but the present invention is not limited thereto. For example, a configuration may be adopted in which the centroid of all of the points of interest 1601 is obtained, a predetermined number of points of interest that are close to the centroid are selected, and the area 1603 is determined so as to include the selected points of interest.

Next, a method for reflecting clustering of motion vectors on area control will be described. Regarding a case where the degree of interest for a background and the degree of interest for a main subject are approximately the same, the same number of motion vectors of the background and motion vectors of the main subject are desirably detected. In the example in FIG. 10D, the number of motion vectors of the background is 25, the number of motion vectors of the main subject is 13, and the number of motion vectors that have been incorrectly detected is 10. The number of motion vectors of the background and the main subject is 38 in total, and thus by equally dividing the 38 motion vectors, a target number of motion vectors for each of the background and the main subject is obtained as 19. Comparing the numbers of vectors, the number of motion vectors of the background is larger than the target number of motion vectors (hereinafter, referred to as a target number of vectors) by 6, and the number of motion vectors of the subject is smaller than the target number of vectors by 6. Therefore, 24 point-of-interest setting areas that have been equally set in a wide area of the screen and the main subject area, as in 6e and 6f in FIG. 6, are changed to be as shown in FIGS. 18A and 18B, respectively.

Figure 18A:
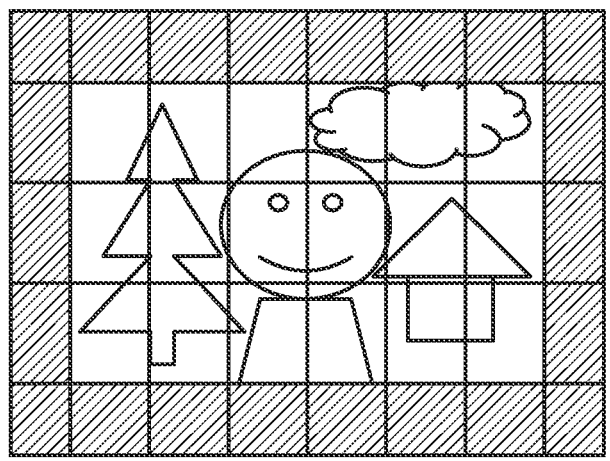
FIGS. 18A and 18B are diagrams for describing control of the number of areas that is based on a clustering processing result.
Figure 18B:
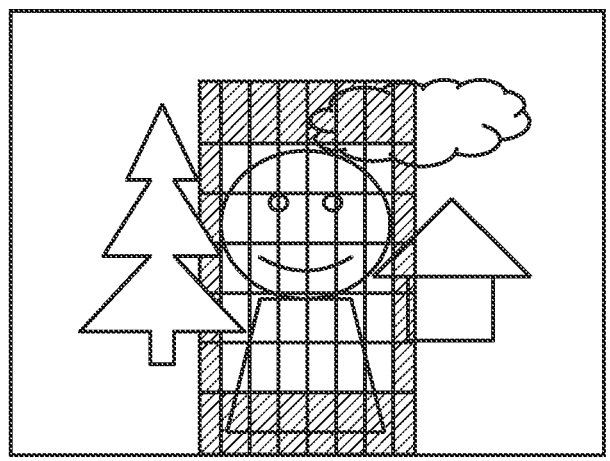

In FIG. 18A, 18 point-of-interest setting areas from among 48 point-of-interest setting areas, which correspond to an upper limit, are arranged in a wide area of the screen so as to detect movement of the background. On the other hand, in FIG. 18B, the remaining 30 points of interest are arranged in the main subject area so as to detect movement of the main subject. By increasing the number of point-of-interest setting areas that are arranged in the main subject area in this manner, it is possible to bring the number of motion vectors of the background and the number of motion vectors of the main subject close to being equal.

Figure 19:
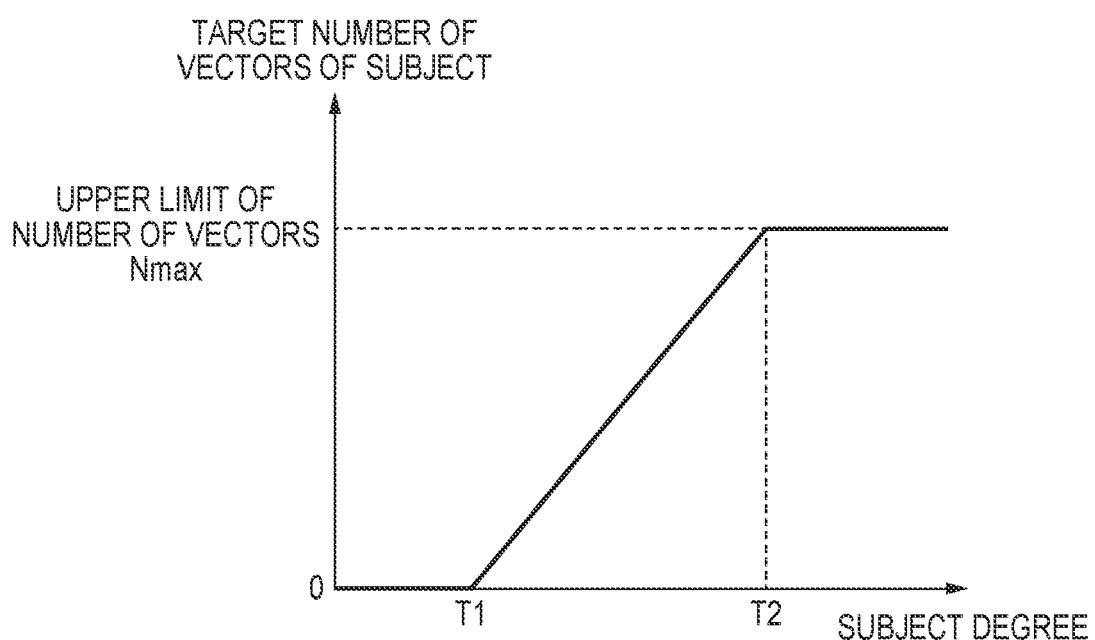
FIG. 19 is a diagram for describing a method for setting a target number of motion vectors that is based on an object of interest.

It is sufficient that a target number Ntar of vectors of a main subject is controlled according to a subject degree as in FIG. 19. In this example, two threshold values T1 and T2 are provided, and if the subject degree is smaller than or equal to T1, the target number Ntar is 0, and if larger than or equal to T2, an upper limit Nmax is adopted. Note that, in the section between the threshold values T1 and T2, the subject degree and the target number of vectors may be associated nonlinearly. In addition, not only the target number of vectors of a main subject but also the target number of vectors of a background may be controlled similarly according to the background degree.

Letting the number of vectors of a main subject that have been actually detected be Ncur, it is sufficient that a change amount of the number of point-of-interest setting areas that are arranged in a main subject area is expressed as $\Delta N = Ntar - Ncur$. Regarding the point-of-interest setting areas that are arranged in the main subject area, the current number of point-of-interest setting areas is expressed as Nx2, Ny2, and the number of point-of-interest setting areas after a clustering result has been reflected is expressed as Nx2', Ny2'. It suffices to obtain a maximum integers Nx2' and Ny2' that satisfy a relationship of $Nx2 \times Ny2 + \Delta N \geq Nx2' \times Ny2'$ in order to reflect the clustering result.

In the above-described example, Nx2=6, Ny2=4, and $\Delta N=6$, and thus $Nx2' \times Ny2' \leq 30$ is derived. For example, when the number of point-of-interest setting areas that are horizontally arranged is fixed, $Nx2'=Nx2=6$, and thus $Ny2'=5$ is derived.

In the above-described manner, clustering of points of interest and motion vectors, which is a clustering result, can be reflected on area control.

As described above, in this embodiment, a result of clustering motion vectors that have been actually detected is fed back to control of divided areas. This brings about an effect that motion vector detection more suitable for the degrees of interest for a background and a main subject than the first embodiment is made possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-098409, filed May 17, 2017, which is hereby incorporated by reference herein in its entirety.

What is claimed is:

1. An image processing apparatus comprising:
one or more processors; and
a memory storing instructions which, when the instructions are executed by the one or more processors, cause the image processing apparatus to function as:
an information acquisition unit configured to acquire information regarding a camera,
an estimation unit configured to estimate an object of interest during shooting, in an image captured by the camera, based on the information regarding the camera, an area dividing unit configured to divide the image into a plurality of divided areas, using each of a plurality of types of dividing methods, and a motion vector detection unit configured to detect a motion vector in the plurality of divided areas regarding each of the plurality of types of dividing methods, wherein the plurality of types of dividing methods include a first dividing method for dividing the image such that each of the plurality of divided areas includes a main subject in the image, and a second dividing method for dividing the image such that each of the plurality of divided areas includes a background in the image, and wherein the higher a degree to which the object of interest estimated by the estimation unit is a main subject is, the more a size of the plurality of divided areas in the first dividing method is reduced or the more the number of the divided areas is increased by the area dividing unit, at least, and the more a size of the plurality of divided areas in the second dividing method is increased or the more the number of the divided areas is reduced by the area dividing unit, at least.

2. The image processing apparatus according to claim 1, wherein the area dividing unit changes the number of divided areas in the first dividing method and the number of divided areas in the second dividing method such that a sum of the number of divided areas in the first dividing method and the number of divided areas in the second dividing method is a certain value.

3. The image processing apparatus according to claim 1, wherein the information regarding the camera includes at least one of a shooting mode, main subject information, a shutter speed, a focal length, depth information, inertial sensor information, and user instruction information.

4. The image processing apparatus according to claim 3, wherein the estimation unit calculates a degree to which an object of interest during shooting is a main subject and a degree to which an object of interest during shooting is a background, based on one or more pieces of the information regarding the camera.

5. The image processing apparatus according to claim 4, wherein the estimation unit calculates a final degree to which the object of interest is a main subject and a final degree to which the object of interest is a background by weighting and adding the degree to which the object of interest is a main subject and the degree to which the object of interest is a background, which have been calculated for each piece of the information regarding the camera.

6. The image processing apparatus according to claim 1, wherein the instructions, when executed by the one or more processors, cause the image processing apparatus to further function as:

a reliability calculation unit configured to calculate a reliability of the motion vector; and a clustering unit configured to perform clustering processing on the motion vector using the reliability, and wherein the area dividing unit changes at least one of a size of a divided area and a number of division in each of the plurality of types of dividing methods for dividing the image, based on output of the estimation unit and the clustering unit.

7. The image processing apparatus according to claim 6, wherein the area dividing unit changes at least one of a size of a divided area and a number of division in each of the plurality of types of dividing methods for dividing the image, based on comparison of a target number of motion vectors that is obtained based on output of the estimation unit and an actual number of motion vectors that is obtained from output of the clustering unit.

8. The image processing apparatus according to claim 6, wherein the reliability calculation unit calculates a reliability of the motion vector based on a result of calculating a correlation value between images in which the motion vector is calculated.

9. The image processing apparatus according to claim 8, wherein the reliability calculation unit performs weighting addition on reliabilities of a plurality of motion vectors, and thereby calculates a final reliability of the motion vectors.

10. The image processing apparatus according to claim 8, wherein the larger a maximum value of correlation between images in which the motion vector is calculated is, the higher a reliability of the motion vector is calculated by the reliability calculation unit.

11. The image processing apparatus according to claim 8, wherein the larger a difference between a maximum value and a minimum value of correlation between images in which the motion vector is calculated is, the higher a reliability of the motion vector is calculated by the reliability calculation unit.

12. The image processing apparatus according to claim 8, wherein the larger a difference between a maximum value of correlation between images in which the motion vector is calculated and at least one local maximum value of the correlation is, the higher a reliability of the motion vector is calculated by the reliability calculation unit.

13. The image processing apparatus according to claim 1, wherein the instructions, when executed by the one or more processors, cause the image processing apparatus to further function as:

a reliability calculation unit configured to calculate a reliability of the motion vector; and a clustering unit configured to perform clustering processing on the motion vector using the reliability, wherein the motion vector detection unit sets points of interest in each of the plurality of divided areas in the first dividing method, and detects a motion vector in the plurality of divided areas based on the points of interest, and wherein the area dividing unit changes a size of the plurality of divided areas in the first dividing method based on distribution of points of interest at which the clustering unit determines that a motion vector of a main subject was detected from among the points of interest that have been set in each of the divided areas in the first dividing method.

14. An image processing method comprising:

acquiring information regarding a camera;

estimating an object of interest during shooting, in an image captured by the camera, based on the information regarding the camera;

dividing the image into a plurality of divided areas, using each of a plurality of types of dividing methods; and detecting a motion vector in the plurality of divided areas regarding each of the plurality of types of dividing methods, wherein the plurality of types of dividing methods include a first dividing method for dividing the image such that each of the plurality of divided areas includes a main subject in the image, and a second dividing method for dividing the image such that each of the plurality of divided areas includes a background in the image, and wherein in the dividing, the higher a degree to which the estimated object of interest is a main subject is, the more a size of the plurality of divided areas in the first dividing method is reduced or the more the number of the divided areas is increased, at least, and the more a size of the plurality of divided areas in the second dividing method is increased or the more the number of the divided areas is reduced, at least.

15. A non-transitory computer-readable storage medium that stores a program for causing a computer to execute steps of an image processing method, the method comprising:

acquiring information regarding a camera;

estimating an object of interest during shooting, in an image captured by a camera, based on information regarding the camera;

dividing the image into a plurality of divided areas, using each of a plurality of types of dividing methods; and detecting a motion vector in the plurality of divided areas regarding each of the plurality of types of dividing methods, wherein the plurality of types of dividing methods include a first dividing method for dividing the image such that each of the plurality of divided areas includes a main subject in the image, and a second dividing method for dividing the image such that each of the plurality of divided areas includes a background in the image, and wherein in the dividing, the higher a degree to which the estimated object of interest is a main subject is, the more a size of the plurality of divided areas in the first dividing method is reduced or the more the number of the divided areas is increased, at least, and the more a size of the plurality of divided areas in the second dividing method is increased or the more the number of the divided areas is reduced, at least.

* * * * *